३,७३४,९२३
THIAZOLE DERIVATIVES
John Dowding, Burnham-on-Crouch, and William George Leeds, London, England, assignors to May & Baker Limited, Dagenham, Essex, England
No Drawing. Filed Aug. 13, 1970, Ser. No. 63,654
Claims priority, application Great Britain, Aug. 15, 1969, 40,868/69
Int. Cl. C07d 91/34
U.S. Cl. 260—306.8 R                    8 Claims

ABSTRACT OF THE DISCLOSURE

The hitherto unknown thiazole derivatives with a urea grouping —N(R⁴)CONR⁵R⁶ (wherein $R^4$ represents a methyl or ethyl group, $R^5$ represents a hydrogen atom or a methyl group, and $R^6$ represents a methyl group or, when $R^4$ and $R^5$ each represent a methyl group, an ethyl or n-propyl group) in the 2-position of the thiazole nucleus, and a bromine, chlorine or iodine atom in the 5-position, and acid addition salts thereof, are useful as herbicides.

---

This invention relates to new thiazole derivatives, their processes of preparation, herbicidal compositions which contain them and their use as herbicides.

It is known, for example from the specifications of British Pat. No. 1,131,207 (applied for Apr. 5, 1966) and French Pat. No. 1,533,184 (applied for Apr. 6, 1965), both granted to Produits Chimiques Pechiney-Saint-Gobain, that the thiazole derivatives of the general formula:

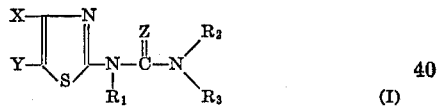

(I)

(wherein X and Y are identical or different and each of them represents a hydrogen or halogen atom or a nitro, thiocyanato, cyano, carboxyl, alkoxycarbonyl, amino hydroxyl, hydroxyalkyl, $C_{1-4}$ alkyl, $C_{1-4}$ alkoxy, $C_{1-4}$ haloalkyl, $C_{1-4}$ haloalkoxy, aryl, halogenated aryl, alkylaryl, alkoxyaryl, halogenated alkylaryl, halogenated alkoxyaryl, aryloxy, halogenated aryloxy, nitroaryloxy or alkylaryloxy group, Z represents an oxygen or sulphur atom, $R_1$ represents a hydrogen atom or an alkyl, alkoxy, alkenyl, alkenoxy or alkynyl group containing from 1 to 4 carbon atoms, or an alkylacyl, halogenated alkylacyl, arylacyl, halogenated arylacyl, alkylarylacyl or alkoxyarylacyl group, and each of $R_2$ and $R_3$ represents a hydrogen atom or an alkyl, alkoxy, alkenyl, alkenoxy, or alkynyl group containing from 1 to 4 carbon atoms or an alkylaryl, halogenated alkylaryl, aryl, halogenated aryl, aryloxy or halogenated aryloxy group, provided that $R_2$ and $R_3$ do not represent hydrogen simultaneously in the same compound) possess valuable herbicidal properties, being particularly useful in inhibiting the growth of or destroying various adventitious plants such as grass, shrubs and undesirable brushwood. The thiazole derivatives of general Formula I may be used as total herbicides, selective herbicides and growth regulators. They can be applied before sowing or planting crops or after sowing but before the growth of crops or weeds, as pre-emergence treatment, or they can be applied after the growth as a post-emergence treatment. A dose range which has been indicated for the use of the thiazole derivatives of general Formula I as herbicides is 0.1 kg. to 30 kg. per hectare (i.e. 0.09 lb. to 27 lbs. per acre), and preferably 0.5 kg. to 20 kg. per hectare (i.e. 0.45 lb. to 18 lbs. per acre) Some of the compounds of general Formula I have been stated to possess substantial persistence, for a period of several weeks to several months, in their effectiveness as herbicides.

As a result of research and experimentation, it has been discovered that a very narrow class of thiazole derivatives previously undisclosed, but falling within the broad class of compounds of general Formula I as hereinbefore defined, possess outstanding valuable properties as herbicides, being substantially more effective as herbicides with lower, more commercially-acceptable application rates then chemically-closely related compounds specifically disclosed in the aforementioned British and French patent specifications and chemically-closely related compounds falling within the scope of the aforementioned British and French patent specifications but not specifically disclosed therein and other chemically-closed related compounds.

According to the present invention there are provided the hitherto unknown thiazole derivatives of the general formula:

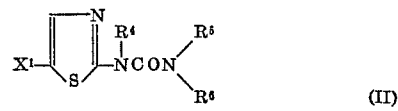

(II)

wherein $X^1$ represents a chlorine, bromine or iodine atom, $R^4$ represents a methyl or ethyl group, $R^5$ represents a hydrogen atom or a methyl group and $R^6$ represents a methyl group or, when $R^4$ and $R^5$ each represent a methyl group, an ethyl or n-propyl group, and their acid addition salts. Preferably $R^4$ and $R^6$ each represent a methyl group and $R^5$ represents a hydrogen atom or a methyl group.

The results obtained in tests carried out under comparable conditions of the herbicidal properties of the compounds of Formula II in comparison with compounds of Formula I are set out below in Tables I, II and III. The test procedures used were:

(a) CONTACT (FOLIAR) APPLICATION

Weeds at seedling stage, grown in pots in the greenhouse, were sprayed with solutions in aqueous acetone (British Pharmacopoeia grade) of compounds under test. The numbers of seedling plants of each species sprayed was five in the case of broad-leafed plants, approximately thirty in the case of *Avena fatua* and approximately 100 in the case of *Alopecurus myosuroides* and *Poa annua*.

A corresponding number of seedlings of each species were sprayed with aqueous acetone alone as blanks for comparison. The concentrations of the thiazole derivatives in the solutions were so arranged that they corresponded to practical application rates starting at a minimum of 0.125 lb. per acre and increasing geometrically by a factor of 2 to a maximum of 8 lbs. per acre applied in 45 gallons of spray fluid per acre. Application was effected by means of a laboratory precision sprayer which had previously been calibrated to deliver this volume. The plants were then maintained for from 20 to 30 days in the greenhouse under standard conditions of temperature and day-length, with normal watering from the day after spraying. Herbicidal activity was visually assessed after 20 to 30 days for each species for each application rate of each compound and the minimum herbicidally effective dose, i.e. the dose giving 90% kill, expressed for each species.

(b) RESIDUAL (SOIL) ACTIVITY (STERILIZED SOIL)

Weed seeds were sown on the surface of sterilized soil (John Innes No. 1 Potting Composition) contained in small pots, one pot of each species being allowed to each treatment. The compounds under test, in solution in aqueous acetone, were applied to the soil and uncovered seeds by means of a laboratory precision sprayer calibrated to apply 45 gallons of spray solution per acre, at concentrations corresponding to practical application rates of 0.125, 0.25, 0.5 1, 2, 4 and 8 lbs. per acre. One set of pots was sprayed with acetone to serve as controls for comparison. The seeds were then covered with sand and kept in the greenhouse under standard conditions of temperature with normal watering from the day after spraying. After 20 to 30 days in the greenhouse, a visual assessment was made of the minimum application rate of each test compound required to produce 90% or more reduction in growth of each weed species, as compared with the controls (the minimum herbicidally effective dose—MED).

(c) RESIDUAL (SOIL) ACTIVITY: COMPARISON OF ACTIVITY IN STERILIZED AND UNSTERILIZED SOILS

The test procedure described above in (b) was used except that the seeds were covered with soil before being sprayed. Each test compound was applied to two sets of pots, one set containing John Innes No. 1 Potting Compost (sterilized soil) and the other Kettering Loam (unsterilized soil).

(d) RESIDUAL SOIL ACTIVITY: DETERMINATION OF ED90

Some species (as indicated by footnote reference 1 in Table III) were sown in and covered with Kettering Loam contained in small pots, one pot of each species being allowed to each treatment. The compounds were applied as in (b) above at concentrations corresponding to practical application rates of 0.125, 0.25, 0.5, 1, 2 and 4 lbs. per acre. After 28–30 days in the greenhouse the parts of the plants above ground were cut off and weighed fresh, and the reduction of growth caused by each rate calculated as a percentage of untreated control plants. The doses producing a 90% reduction in growth in comparison with untreated control plants (ED90) were then obtained graphically from a log-probit dosage response line.

(The MED is a visual estimate of the ED90 and the two values are comparable. The distinction is made for the purposes of accuracy.)

TABLE I

Contact and residual (sterilized soil) activity of compounds of the present invention Note.—Compound 1A is the hydrobromide acetate of Compound I. Compound 1B is the hydrobromide of Compound I.

In the results set out in Tables I, II and III, the symbols have the following meanings:

(i) NR means no significant herbicidal effect could be detected at the highest rate of test compound applied (8 lbs. per acre).
(ii) — means that the test compound in question was not tested against that particular plant species.
(iii) a figure preceded by the symbol > means that substantially less than 90% kill was produced at that application rate, which was the highest tested (taking into account the accepted statistical interpretation of this figure for the number of replicate plants).
(iv) a figure preceded by the symbol ≫ means that a slight reduction in growth was produced at that application rate, which was the highest tested.
(v) in a number of instances, the kill obtained of a species at a particular application rate was slightly below 90%, while a complete kill was obtained at the next higher application rate. In this case, the minimum herbicidally effective dose was expressed as being between these two application rates, for example 1–2 lbs. per acre.
(vi) the symbol < means that complete kill was obtained at this rate of application, which was the lowest tested.

In these tests, no significant difference could be detected between the controls sprayed with aqueous acetone and unsprayed plants grown under the same conditions.

In the results which are given below in Tables I, II and III, the various substituents upon the thiazolylurea nucleus are identified according to the general formula:

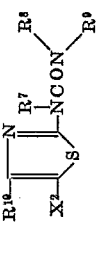

It will be appreciated that the above formula is generic to the compounds of general Formula II and certain of the classes of compounds represented by general Formula I which are closely-related to the compounds of Formula II and that the appropriate adjustments in identification of the symbols must be made in identifying the individual compounds in terms of the definitions of Formulae I and II.

TABLE II

Contact and residual (sterilized soil) activity of compounds of general formula I Minimum effective dose, lbs./acre

| Compound No. | Substituents | | | | Contact (foliar) activity | | | | | | | Residual (soil) activity (sterilized soil) | | | |
|---|---|---|---|---|---|---|---|---|---|---|---|---|---|---|---|
| | R7 | R8 | R9 | R10 | X2 | Chenopodium album | Polygonum lapathifolium | Sinapis arvensis | Matricaria inodora | Stellaria media | Avena fatua | Alopecurus myosuroides | Poa annua | Sinapis arvensis | Matricaria inodora | Avena fatua | Poa annua |
| 13 | H | Me | H | H | H | >8 | 4 | 4–8 | 8 | >8 | 8 | 4–8 | 4 | 4–8 | 8 | >8 | >8 |
| 14 | H | C6H5 | H | H | H | NR | NR | NR | NR | NR | NR | NR | NR | NR | NR | NR | NR |
| 15 | H | Me | H | H | Me | 2–4 | 4 | 4–8 | 4–8 | >8 | >8 | 0.5 | 0.25–0.5 | | | 4–8 | 0.25 |
| 16 | H | Me | H | H | Cl | 0.125 | 0.125 | 0.125 | 0.125 | 0.25–0.5 | 1 | 0.5 | 0.25–0.5 | 0.125–0.25 | 0.25–0.5 | 0.25–0.5 | 1 |
| 17 | H | Me | H | H | Cl | 0.25 | 0.5 | 0.125 | 0.25 | 0.125–0.25 | 0.5 | 0.5 | 0.5 | 0.5 | 0.5 | | 0.25 |
| 18 | H | Me | H | H | Br | <0.125 | <0.125 | <0.125 | 0.125 | 4–8 | 1 | 4–8 | 0.125 | 0.5 | 0.125 | 1 | 0.25 |
| 19 | H | Me | Me | H | Cl | 4 | 1–2 | 4–8 | 4–8 | 4–8 | NR | NR | 4–8 | 4 | >8 | >8 | NR |
| 20 | H | Me | Me | CF3 | Br | <0.125 | 0.5 | 2 | >8 | 2 | >8 | >8 | 2 | 4 | >8 | >8 | 8 |
| 21 | H | Me | H | Me | Cl | <0.125 | 1 | <0.125 | 4–8 | 4–8 | 8 | >8 | 2–4 | 0.5 | 4–8 | 4–8 | 4–8 |
| 22 | H | Me | Me | Me | Br | <0.125 | 0.5 | 0.125 | 0.5 | 2 | 1–2 | 1–2 | 1 | 1–2 | 0.5 | 1–2 | 1–2 |
| 23 | H | Me | H | Me | Br | <0.125 | 1 | 0.25–0.5 | 0.5 | 0.125–0.25 | 1–2 | 2 | 1 | 2 | 2 | 2–4 | 4 |
| 24 | n-Pr | Me | H | H | Cl | <0.125 | 0.5 | <0.125 | 0.125 | 1 | 2 | 2 | 1 | NR | 0.5 | >8 | >8 |
| 25 | n-Pr | Me | H | H | Br | 0.5 | NR | NR | NR | NR | NR | >8 | >8 | NR | >8 | NR | NR |
| 26 | iso-Pr | Me | H | H | Br | >8 | >8 | >8 | >8 | NR | NR | NR | >8 | NR | >8 | NR | NR |
| 27 | iso-Pr | Me | H | H | I | 4–8 | 8 | >8 | 4–8 | NR | NR | NR | NR | NR | >8 | NR | NR |
| 28 | n-Bu | Me | H | H | Cl | 8 | 8 | 8 | 8 | NR | NR | NR | NR | NR | NR | NR | NR |
| 29 | n-Bu | Me | H | H | Br | 8 | 8 | 8 | 8 | NR | NR | NR | NR | NR | >8 | NR | NR |
| 30 | iso-Bu | Me | H | H | Cl | 8 | 2 | 2 | 4 | 2 | NR | NR | NR | NR | NR | NR | NR |
| 31 | iso-Bu | Me | H | H | Br | 2 | 4 | 2 | 4–8 | 4–8 | >8 | NR | >8 | NR | NR | NR | NR |
| 32 | sec-Bu | Me | H | H | Cl | >8 | >8 | >8 | NR | >8 | >8 | NR | >8 | NR | NR | NR | NR |
| 33 | sec-Bu | Me | H | H | Br | 4–8 | 4 | >8 | NR | NR | NR | NR | NR | NR | NR | NR | NR |
| 34 | Me | Et | H | H | Br | 2–4 | 2 | 2–4 | 4 | 8 | 8 | 4–8 | 2 | 2–4 | 1 | 8 | 4–8 |
| 35 | Me | Et | H | H | Cl | 0.5 | 0.5 | 1–2 | 1 | 2 | 8 | 8 | 2–4 | 1–2 | 1–2 | 4 | 4 |
| 36 | Me | n-Pr | H | H | I | 1 | 1 | 4 | 4 | 4 | >8 | NR | 8 | 4–8 | 4 | >8 | 8 |
| 37 | Me | n-Pr | H | H | Cl | 2 | 2 | 8 | NR | 4 | NR | NR | NR | 4 | 8 | >8 | >8 |
| 38 | Me | iso-Pr | H | H | Br | 1–2 | 8 | 8 | NR | 8 | NR | NR | NR | 8 | >8 | NR | NR |
| 39 | Me | iso-Pr | H | H | I | 2 | 2 | 8 | NR | 8 | NR | NR | NR | 8 | 4 | >8 | NR |
| 40 | Me | Cyclo-Pr | H | H | Br | <0.125 | 2 | 2 | NR | 2 | >8 | >8 | >8 | 0.5 | 4 | >8 | >8 |
| 41 | Me | Propargyl | H | H | Cl | <0.125 | 4 | 2 | 4 | 4 | >8 | >8 | 1 | 2 | 1–2 | 2–4 | 1–2 |
| 42 | Me | n-Bu | H | H | Cl | 1–2 | 4 | 2–4 | NR | 2–4 | 8 | 4–8 | 2 | 4 | 4 | 4 | 2–4 |
| 43 | Me | iso-Bu | H | H | Br | 1 | >8 | 4 | >8 | 4 | >8 | >8 | 4 | >8 | >8 | >8 | 8 |
| 44 | Me | t-Bu | H | H | Cl | >8 | >8 | NR | NR | >8 | >8 | >8 | >8 | NR | NR | NR | >8 |
| 45 | Me | t-Bu | H | H | Br | NR | NR | NR | NR | NR | NR | >8 | NR | NR | NR | >8 | NR |
| 46 | Me | sec-Bu | H | H | Cl | 8 | 8 | 4–8 | 4 | 8 | 8 | NR | NR | 4–8 | NR | NR | NR |
| 47 | Me | sec-Bu | H | H | Br | 2 | 2 | 1–2 | 4–8 | 1–2 | 8 | 4–8 | 4–8 | 1 | 1–2 | 1–2 | 8 |
| 48 | Me | Allyl | H | H | I | 0.25 | 1 | 0.5 | >8 | 1 | 1–2 | 2–4 | 2 | NR | 2 | 1–2 | >8 |
| 49 | Me | do | H | H | Br | <0.125 | 0.125 | 0.5 | >8 | NR | 2 | 8 | 0.5 | 1 | 2 | 2 | 0.5 |
| 50 | Me | n-Pr | H | H | I | NR | NR | NR | NR | NR | NR | NR | NR | NR | NR | NR | NR |
| 51 | n-Pr | n-Pr | H | H | Br | NR | NR | | | | | | | | | | |

TABLE II—Continued

| Compound No. | Substituents | | | | | | Contact (foliar) activity — Minimum effective dose, lbs./acre | | | | | | | | Residual (soil) activity (sterilized soil) | | | | | |
|---|---|---|---|---|---|---|---|---|---|---|---|---|---|---|---|---|---|---|---|---|
| | R⁷ | R⁸ | R⁹ | R¹⁰ | X² | | Chenopodium album | Polygonum lapathifolium | Sinapis arvensis | Matricaria inodora | Stellaria media | Avena fatua | Alopecurus myosuroides | Poa annua | Sinapis arvensis | Matricaria inodora | Avena fatua | Poa annua | | |
| 52 | Me | iso-Pr | iso-Pr | H | Br | | >8 | >8 | 4 | NR | >8 | NR | NR | NR | NR | NR | NR | NR | | |
| 53 | Me | n-Pr | n-Pr | H | H | | >8 | NR | 4–8 | NR | >8 | NR | NR | NR | NR | NR | 2 | NR | | |
| 54 | Me | Allyl | Me | H | Br | | <0.125 | 0.5 | 0.5–1 | 0.5–0.5 | 1–2 | 4 | 2 | 0.5 | 1 | 0.25–0.5 | 2 | 0.5 | | |
| 55 | Me | n-Bu | Me | H | Br | | <0.125 | 1 | 0.125 | | 4 | 8 | 8 | 2 | 2–4 | 1–2 | 2 | 1 | | |
| 56 | Me | iso-Pr | Me | H | Br | | <0.25 | 1–2 | 1 | NR | 2 | 8 | 4 | 8 | 1–2 | 0.5–1 | 2 | 2 | | |
| 57 | Me | iso-Pr | Me | H | L | | <0.125 | 2–4 | 0.5 | NR | 1 | >8 | 2 | 4 | 0.5 | <0.125 | 2 | 0.5 | | |
| 58 | Me | Et | Et | H | Br | | 0.25 | 8 | 2 | NR | 2–4 | >8 | 8 | >8 | 4–8 | 4–8 | 8 | 8 | | |
| 59 | Me | Me | Et | H | Br | | 0.25 | 8 | 2 | NR | 8 | >8 | 4 | >8 | 2 | 2 | 8 | 4 | | |
| 60 | n-Pr | Me | Me | H | Br | | 1 | >8 | 8 | NR | 8 | >8 | >8 | >8 | 4–8 | 4–8 | >8 | >8 | | |
| 61 | n-Bu | Me | H | H | Br | | NR | >8 | >8 | NR | NR | NR | NR | NR | NR | NR | NR | NR | | |
| 62 | H | n-Pr | Me | H | Br | | NR | NR | 4–8 | NR | NR | NR | NR | NR | NR | NR | NR | NR | | |
| 63 | Me | Et | Et | H | L | | 0.125 | 4–8 | 2–4 | 0.25–0.5 | 2–4 | >8 | >8 | 4 | 2–4 | 0.5–1 | 2–0 | 4 | | |
| 64 | Me | Me | Me | H | Cl | | <0.125 | 2 | 0.125 | NR | NR | NR | NR | NR | NR | NR | NR | 4–8 | | |
| 65 | Benzoyl | Me | H | H | H | | 8 | >8 | >8 | NR | 8 | NR | NR | 4 | 8 | NR | 4–8 | 8 | | |
| 66 | Allyl | Me | H | H | Cl | | 8 | >8 | 4 | NR | >8 | NR | NR | 8 | >8 | >8 | >8 | >8 | | |
| 67 | But-2-enyl | Me | H | H | Cl | | 8 | >8 | >8 | NR | 8 | NR | NR | 4 | >8 | >8 | >8 | 4 | | |
| 68 | Propargyl | Me | H | H | Br | | 1–2 | 8 | 4 | 4 | 2–4 | NR | NR | 4–8 | 2–4 | NR | 2 | 1–2 | | |
| 69 | Me | Cyclo-Pr | Me | H | Br | | 0.25 | 2–4 | >8 | >8 | 4 | >8 | >8 | 4–8 | 1 | 2 | >8 | 8 | | |
| 70 | Propargyl | Me | H | H | Br | | 1 | 2–4 | >8 | NR | 2 | >8 | >8 | 4–8 | 1 | 2 | 8 | 4 | | |
| 71 | n-Pr | n-Pr | H | H | Br | | NR | NR | NR | NR | NR | NR | NR | NR | NR | NR | NR | NR | | |
| 72 | Me | Pentamethylene | H | | Br | | 4–8 | 2 | 0.5–1 | 1–2 | 4–8 | >8 | 8 | >8 | 4–8 | 1–2 | NR | 1–2 | | |
| 73 | H | Me | H | | Br | | 1 | 2 | 2 | 1–20 | 4 | 4 | >8 | 2 | 2 | 0.5–1 | 4 | 0.5–1 | | |

¹ Compounds Nos. 74 and 75 are thioureas, i.e.: Compound No. 74 is 1-(5-bromothiazol-2-yl)-3-methylthiourea. Compound No. 75 is 1-(5-bromothiazol-2-yl)-3,3-dimethylurea.

Comparison of residual activity in sterilised soil (John Innes Potting Composition) and natural unsterilised soil (Kettering Loam) (A) of compounds of Table I and (B) compounds of Table II which show significant residual activity in sterilised soil. (In the following Table III, 'JIP' = John Innes No. 1 potting Composition and 'KL' = Kettering Loam)

TABLE III

| | Substituents (A) | | | | | | Minimum effective dose, lbs./acre, residual (soil) activity (sterilized and unsterilized soil) | | | | | | | | | |
|---|---|---|---|---|---|---|---|---|---|---|---|---|---|---|---|---|
| Compound No. | R⁷ | R⁸ | R⁹ | R¹⁰ | X² | Soil type | Echinochloa crus-galli | Chenopodium album | Polygonum lapathifolium | Sinapis arvensis | Matricaria inodora | Stellaria media | Avena fatua | Alopecurus myosuroides | Poa annua | Polygonum convolvulus |
| 1 | Me | Me | H | H | Br | JIP / KL | ¹0.4 | 0.25 | 0.2 | <0.125 | <0.125 | | 0.125–0.25 | ¹0.4 | 0.125 | ¹0.4 |
| 2 | Me | Me | H | H | Cl | JIP / KL | ¹0.5 | 0.125 | 0.25 | <0.125 | 0.125 | 0.5 | 0.5 | 0.25 | 0.25 | ¹0.3 |
| 3 | Me | Me | H | H | I | JIP / KL | ¹0.9 | 0.40 | 0.5–1 | <0.125 | 0.25 | 0.25 | 0.5–1 | 1–2 | 0.125 | ¹1.0 |
| 4 | Et | Me | H | H | Br | JIP / KL | | | | 0.25 | 0.25 | ¹0.6 | 2 | | 0.5 | |
| 5 | Et | Me | H | H | Cl | JIP / KL | | | | 0.5 | <0.125 | | 0.5 | | 0.25 | |
| 6 | Et | Me | H | H | I | JIP / KL | | | | 0.5 | 0.125 | | 0.5–1 | | 0.25 | |
| 7 | Me | Me | Me | H | Br | JIP / KL | ¹0.4 | 0.25 | 0.25 | 0.125 | 0.25 | 2 | 4 | 1–2 | 0.5 | ¹0.3 |
| 8 | Me | Me | Me | H | I | JIP / KL | | | | 0.25 | 0.25 | ¹0.3 | 0.25–0.5 | ¹0.6 | 0.25 | |
| 9 | Me | Me | Me | H | Cl | JIP / KL | | | 0.25 | 0.25–0.5 | <0.125 | | 0.5–1 | 1 | 0.25 | |
| 12 | Me | Me | n-Pr | H | Br | JIP / KL | | | 1 | 0.125 | 0.125 | 0.25 | >2 | | 0.125 | |
| | Substituents (B) | | | | | | | | | | | | | | | |
| 16 | H | Me | H | H | Cl | JIP / KL | ¹4.4 | 1–2 | 2 | 0.125–0.25 | | 2 | 0.25–0.5 | ¹2.5 | 0.25 | ¹2.4 |
| 17 | H | Me | Me | H | Cl | JIP / KL | | 2 | 2 | 1–2 | 0.25–0.5 | | 2.5 | 4 | 2 | |
| 18 | H | Me | Me | H | Br | JIP / KL | | | | 0.5 | 0.5–1 | 2 | 4 | | 1 | |
| 21 | H | Me | H | Me | Cl | JIP / KL | | 1–2 | 1–2 | 0.5 | 0.5–1 | | 4 | 2–4 | 0.25 | |
| | | | | | | JIP / KL | | 8 | NR | NR | | NR | 4–8 | NR | >8 | |

¹ = ED₉₀.

As is readily apparent from the foregoing tables, the test compounds 1 to 12 of Table I, which are representative of the thiazole derivatives of the present invention, are highly active as herbicides against the spectrum of weed species tested, which are representative of the varieties of plant species encountered in weed-control problems in agriculture, and are effective as herbicides at very much lower application rates than the vast majority of 63 test compounds representative of the most closely chemically-related classes of thiazole derivatives disclosed in the aforementioned British and French specifications and closely chemically related compounds, i.e. test compounds 13–15, 19, 20, and 22–75. In addition, although the latter compounds are found to be effective as herbicides at comparatively low application rates against certain of the tested weed species, other species are found to be much more resistant, thereby requiring the use of higher dose rates if a broad spectrum of weed species is to be controlled. It will be readily appreciated that the Minimum Effective Dose for a particular compound against all or a substantial majority of weed species is of particular importance, subject to one important qualification which will be discussed hereafter, since the individual weed species which will be encountered in a particular problem of weed control will vary from place to place and cannot be predicted with certainty and a broad spectrum of activity is, accordingly, desirable to achieve flexibility of weed control at commercially-acceptable application rates. The important qualification mentioned above is that selectivity in herbicidal activity between types of plant species may be of importance in certain weed control/crop situations and, accordingly, although the test compounds 10 and 11 require comparatively high rates of application to control the monocotyledons *Avena fatua* and *Alopecurus myosuroides* by contact application, this is not significantly disadvantageous since it is indicative of a selective control of dicotyledonous weed species by contact or post-emergence application in emerged monocotyledonous crops. In addition, test compounds 10 and 11 show a high degree of residual herbicidal activity, as does test compound 12 which is less effective by contact application, which is indicative of usefulness in the pre-emergence control of weeds by application to an emerged crop.

A particularly valuable property of the new compounds of general Formula II, which are distinguished from compounds specifically disclosed in the prior art by the presence of a methyl or ethyl group on the urea-nitrogen atom adjacent to the thiazole nucleus, a chlorine, bromine or iodine atom in the 5-position of the thiazole nucleus and no substituent in the 4-position of the thiazole nucleus, is that the high degree of activity as residual herbicides which is found when they are tested in sterilized soil, as is shown in Table I, is not found to be substantially adversely affected when the compounds are tested in unsterilized soil, which is more closely representative of conditions found in agricultural practice. Certain of the compounds of Table II specifically disclosed in, or falling within the scope of, the aforementioned British and French specifications, i.e. test compounds 16, 17, 18 and 21, of which compound 16, i.e. N-(5-chloro-2-thiazolyl)-N'-methylurea [or 1-(5-chlorothiazol-2-yl)-3-methylurea] is, on the whole, the most active of the prior art compounds, give results comparable with those of the compounds of Table I in the tests of contact activity and residual activity in sterilized soil, the results of which are set out in Tables I and II. The results of tests of residual activity in unsterilized soil set out in Table III show, however, that the test compounds 16, 17, 18 and 21 are less active in unsterilized soil and require substantially higher rates of application to achieve weed control than the compounds of the present invention.

As is well-known to those skilled in the art, the rates of application found to control weeds in the greenhouse are almost inevitably found to require multiplication by a factor of 2, or sometimes as much as 4, to achieve comparable control under natural conditions in the field and it is to be expected that test compounds 16, 17, 18 and 21 would require application rates of at least 4 lbs. per acre and more probably as high as 8 lbs. per acre to achieve acceptable control of a range of weed species when used in the field as residual herbicides. This is in marked contrast to the compounds of the present invention which have been found to give satisfactory control of weeds in the field as residual herbicides at application rates of 1 to 2 lbs. per acre.

It therefore follows that test compounds 16, 17, 18 and 21 would have to be used, in practice, at these higher, less economically-acceptable application rates to control weeds by pre-emergence application. (By the term "pre-emergence application" is meant application to the soil in which the weed seeds or seedlings are present before the emergence of the weeds above the surface of the soil, e.g. to germinating weed seeds.) If used at lower application rates, control of weeds would be limited to post-emergence application to emerged weeds, in which situation it would be found that crops would, for the greater part, have emerged. (By the term "post-emergence application" is meant application to the aerial or exposed parts of the emerged weeds or to the soil in which they are growing.) This would represent a practical limitation of use of substantial importance since the range of crops which are resistant to post-emergence application of these herbicides is less extensive that the range which are resistant to pre-emergence application. Furthermore, it is important to control weeds before they have become established to avoid competition with the crop during the critical growth stage of the latter when it has emerged and is becoming established. In consequence, the time of application of the herbicides, which have only post-emergence activity, to effect control of weeds is much more critical than when weed control is achieved by pre-emergence application. This is of particular practical importance since application, e.g. spraying, cannot be carried out under adverse weather conditions and successful use of the herbicides by post-emergence application requires coincidence of the critical time of application and favourable weather conditions which cannot be predicted with certainty in many situations. Furthermore, subsequently-germinating weeds would not be affected. This is not to say that herbicides active by post-emergence application are lacking in practical utility, since their satisfactory use is widespread, but that the combination of pre- and post-emergence activity found with the compounds of the present invention represents a substantial practical advantage.

Some of the compounds disclosed in the aforementioned British and French specifications are stated to possess long persistence in soil but would require the application of at least the amount of active ingredient found necessary to produce a residual herbicidal effect and possibly more, since persistence of herbicidal action is, at least in part, a function of the concentration of the herbicide in the soil and is affected by factors such as leaching and biological degradation of the herbicide. The compounds of general Formula II have been found to exercise a persistent residual herbicidal effect at the lower, more-economically acceptable application rates at which they may be used, which persists throughout the life of the crop and continues to act residually against weeds germinating at intervals after application. This is of great practical importance since in many agricultural situations successive flushes of weeds germinate during the critical growing time of the crop when it is most likely to be adversely affected by weed competition. A residual herbicide which was of limited persistence would be less convenient and less economical than one which was more persistent since more than one application might be required to achieve satisfactory weed control.

For herbicidal purposes, the thiazole derivatives of general Formula II may be used as such or in the form of their agriculturally-acceptable acid addition salts. By the term "agriculturally-acceptable acid addition salts" as used in the present specification is meant salts which are conventionally accepted in agricultural practice as being suitable derivatives of herbicidally active bases, i.e. salts the anions of which do not significantly vitiate the herbicidal properties of the base and which do not possess properties rendering them unsuitable for use as herbicides. The thiazole derivatives of general Formula II are weak bases and the salts are, accordingly, formed with strong acids. Examples of such salts are salts obtained from mineral acids, for example hydrohalides, e.g. hydrochlorides, hydrobromides and hydroiodides, and strong organic acids, e.g. toluene-p-sulphonates. Agriculturally-acceptable acid addition salts include the hydrochlorides, hydrobromides and hydroiodides containing acetic acid hereinafter described. The agriculturally-acceptable acid addition salts may be prepared as hereinafter described for the preparation of acid addition salts.

According to a feature of the present invention, at least one of the compounds of general Formula II and their agriculturally-acceptable acid addition salts are used to control the growth of weeds (i.e. undesired vegetation). For this purpose, they are normally used in the form of herbicidal compositions (i.e. in association with compatible diluents or carriers suitable for use in herbicidal compositions), for example as hereinafter described.

The compounds of general Formula II and their agriculturally-acceptable acid addition salts may be used to control the growth of dicotyledonous (i.e. broad-leafed) and monocotyledonous (e.g. grass) weeds by both post- and pre-emergence application. For example, the compounds of general Formula II and their agriculturally-acceptable acid addition salts may be used to control the growth of weeds such as *Amaranthus retroflexus, Amsinckia intermedia, Anthemis arvensis, Aphanes arvensis, Barbarea vulgaris,* Brassica spp. (e.g. *Sinapis arvensis*), *Capsella bursa-pastoris,* Cerastium spp. (e.g. *Cerastium holosteoides*), Chenopodium spp. (e.g. *Chenopodium album*), *Chrysanthemum segetum,* Cirsium spp. (e.g. *Cirsium arvense*), *Descurainea sophia, Emes australis, Equisetum arvense, Euphorbia esula, Galeopsis tetrahit, Galinsoga parviflora, Galium aparine, Lamium purpureum,* Matricaria spp. (e.g. *Matricaria inodora* and *Matricaria matricoides*), *Plantago lanceolata,* Polygonum spp. (e.g. *Polygonum aviculare*) *Polygonum convolvulus, Polygonum lapathiofolium,* and *Polygonum scabrum*), *Portulaca oleracea, Senecio vulgaris,* Sonchus spp. (e.g. *Sonchus oleraceus*), *Spergula arvensis, Stellaria media,* Tussilago spp. (e.g. *Tussilago farfara*), *Urtica urens,* Veronica spp. (e.g. *Veronica agrestis, Veronica hederifolia* and *Veronica persica*), Agropyron spp. (e.g. *Agropyron repens*), Alopecurus spp. (e.g. *Alopecurus pratensis* and *Alopecurus myosuroides*), *Avena fatua, Bracharia cruciformis, Bromus tectorum, Digitaria sanguinalis,* Echinochloa spp. (e.g. *Echinochloa crus-galli*), *Eleusine africana, Leptachloa filiformis, Pennisetum clandestinum,* Poa spp. (e.g. *Poa annua*), Setaria spp. (e.g. *Setaria viridis*), *Cynodon dactylon* and *Sorghum halepense.*

The amounts of compounds of general Formula II and their agriculturally-acceptable acid addition salts applied vary with the nature of the weed, the type of soil, the time of application and (when used to control the growth of weeds in crop-growing areas) the nature of the crops. In general, taking these factors into account, application rates between ¼ and 2 lbs. of active material per acre give good results. However, it must be understood that higher or lower application rates may be used, depending upon the particular problem of weed control encountered.

The compounds of general Formula II and their agriculturally-acceptable acid addition salts may be used to control the growth of weeds, for example those species hereinbefore mentioned, by pre- or post-emergence application to a locus of weed infestation which may be an area used for growing crops of maize, rice, wheat, barley, peas, beans, soya beans, groundnuts, cotton, potatoes and flax, by application before the crop has emerged: application rates of ½ to 2 lbs. of active ingredient per acre are particularly suitable, being well-tolerated by the crops. The persistence of the herbicidal effects of the compounds of general Formula II and their agriculturally-acceptable acid addition salts by pre-emergence application allows, by appropriate selection of the time of application, the control of the weeds during the critical growing period after the crops have emerged.

The compounds of general Formula II and their agriculturally-acceptabe acid addition salts may also be used to control, by pre- or post-emergence application, the growth of weeds in established orchards, particularly orchards of temperate trees, e.g. apple orchards, vineyards, plantations, e.g. sugar cane, pineapple and banana plantations, shrubberies (including areas used to grow fruit-bearing bushes, particularly temperate bushes, e.g. blackcurrants) and forest trees, for which purpose they are preferably applied in a directional fashion (e.g. by directional spraying) to the weeds or to the soil in which they are expected to appear, avoiding application to the arborescent plants. When used for such purposes, in which a total herbicidal effect is frequently desired, the active compounds are normally applied at dose rates higher than those used in the crop-growing areas mentioned above in which the crop has not yet emerged or is recently emerged and not yet established. For these purposes, application rates of 1 to 4 lbs. of active ingredient per acre are generally suitable. However, higher or lower application rates may be used, depending upon the particular problem of weed control encountered. The persistence of the herbicidal effects of the compounds of general Formula II and their agriculturally-acceptable acid addition salts by pre-emergence application enables weed growth to be controlled for useful periods of time, depending upon the rate of application, e.g. three to four months, but not for excessively long periods of time which might cause difficulties if it were wished to plant the treated area with crops which would be adversely affected by the herbicidal effect if it were still present.

The compounds of general Formula II and their agriculturally-acceptable acid addition salts may also be used to control, by pre- or post-emergence application, weeds, for example those species hereinbefore mentioned, and in particular grass weeds, in established cereal crops, e.g. over-wintered wheat and barley, and transplanted crops such as paddy rice, and to prevent re-appearance of weeds by their persistent herbicidal effect by pre-emergence application. For this purpose, application rates of ½ to 2 lbs. of active ingredient per acre are particularly suitable, being well tolerated by the crops.

The compounds of general Formula II and their agriculturally-acceptable acid addition salts may also be used to control, by pre- or post-emergence application, the growth of weeds, for example those species hereinbefore mentioned and in particular the perennial weeds, e.g. Cirsium spp., Sonchus spp., Tussilago spp. and Agropyron spp., in non-agricultural land, for example air fields, industrial sites, railways and roadside verges, and areas of fallow or uncultivated agricultural land, preventing re-infestation by their persistent herbicidal effect by pre-emergence application. When used for these purposes, in which a total herbicidal effect is frequently desired, the active compounds are normally applied at dose rates higher than those in crop-growing areas. For these purposes, application rates of 2 to 4 lbs. of active ingredient per acre are generally suitable. However, higher or lower application rates may be used, depending upon the particular problem of weed control encountered.

The compounds of general Formula II and their agriculturally-acceptable acid addition salts may also be used as defoliants and desiccants on crops, for example cotton and potatoes, for which purposes application rates of 1 to 2 lbs. of active ingredient per acre are generally suitable.

According to features of the present invention, the compounds of general Formula II are prepared by the following methods:

(a) Bromination, chlorination or iodination by known methods of compounds of the general formula:

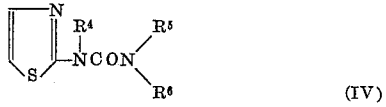

(IV)

(wherein $R^4$, $R^5$ and $R^6$ are as hereinbefore defined) using suitable brominating, chlorinating or iodinating agents (e.g. chlorine, sulphuryl chloride, bromine, bromine and hydrobromic acid, iodine monochloride or an alkali metal, e.g. potassium, iodide and an alkali metal, e.g. potassium, iodate) in the presence of water or an inert organic solvent, for example a halogenated aliphatic hydrocarbon, e.g. chloroform, 1,2-dichloroethane or sym-tetrachloroethane, a lower aliphatic acid, e.g. acetic acid, or an aqueous lower alkanol, e.g. aqueous ethanol, if necessary, e.g. in the case of iodination with an alkali metal iodide and alkali metal iodate, in the presence of an inorganic acid, e.g. sulphuric acid.

[In the following methods (b) to (k), Z represents a bromine, chlorine, iodine or hydrogen atom. As is apparent, when Z represents a bromine, chlorine or iodine atom, the products obtained are compounds of general Formula II. When Z represents a hydrogen atom, the products obtained are compounds of general Formula IV which may be used as starting materials in method (a) hereinbefore described.]

(b) When $R^5$ represents a hydrogen atom and $R^6$ represents a methyl group, reaction of compounds of the general formula:

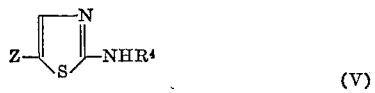

(V)

(wherein $R^4$ and Z are as hereinbefore defined) with methyl isocyanate in an inert organic solvent (e.g. acetone or acetonitrile), preferably at an elevated temperature.

Compounds of general Formula V wherein Z represents a hydrogen atom may be prepared by the application of known methods, for example (i) Reduction of compounds of the general formula:

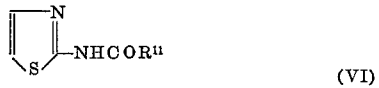

(VI)

(wherein $R^{11}$ represents a hydrogen atom or a methyl group) with lithium aluminum hydride in an inert organic solvent, e.g. diethyl ether.

The compound of general Formula VI wherein $R^{11}$ represents a hydrogen atom may be prepared, for example, by reaction of 2-aminothiazole with formic acid at elevated temperatures. The compound of general Formula VI wherein $R^{11}$ represents a methyl group may be prepared by reaction of 2-aminothiazole with acetic anhydride or acetyl chloride in the presence of an acid binding agent, for example pyridine, which may serve as solvent for the reaction, or triethylamine and, if desired, in the presence of an inert organic solvent, for example a ketone, e.g. acetone.

(ii) Hydrolysis of compounds of the general formula:

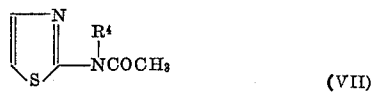

(VII)

wherein $R^4$ is as hereinbefore defined. Hydrolysis is preferably effected by treatment with a dilute mineral acid, e.g. dilute hydrochloric acid, if desired at elevated temperature.

Compounds of general Formula VII may be prepared by the reaction of 2-acetamidothiazole with compounds of the general formula $R^4T$ (wherein $R^4$ is as hereinbefore defined and T represents the acid residue of a reactive ester, for example a bromine or chlorine atom or a sulphuric or sulphonic ester residue) in the presence of a basic condensing agent, for example an alkali metal hydride, e.g. sodium hydride, in an inert organic solvent, for example dimethylformamide.

(iii) Reaction of 1,1-diethoxy-2-chloroethane or 1,1-dichloro-2-ethoxyethane with compounds of the general formula $H_2NCSNHR^4$ (wherein $R^4$ is as hereinbefore defined) in aqueous solution in the presence of a small proportion of mineral acid e.g. hydrochloric acid, preferably at elevated temperatures, e.g. at 95–100° C.

Compounds of general Formula V wherein Z represents a bromine, chlorine or iodine atom may be prepared by the bromination, chlorination or iodination by known methods of the corresponding compounds of general Formula V wherein Z represents a hydrogen atom, for example by the procedures hereinbefore described in (a), by the above processes (i) and (ii), the 5-position bromine, chlorine or iodine atom being introduced by known methods, for example by the procedures hereinbefore described in (a), at any suitable stage in the reaction sequence, e.g. by the bromination, chlorination or iodination of compounds of general Formula VII prior to hydrolysis, or by the preparation of compounds of general Formula VII from 5-bromo-, chloro- or iodo-2-aminothiazoles and 5-bromo-, chloro- or iodo-2-acetamido thiazoles.

The compounds of general Formula V wherein Z represents a bromine or chlorine atom may be prepared by the reaction of 1,1-diethoxy-2,2-dibromoethane or 1,1-diethoxy-2,2-dichloroethane with compounds of the general formula $H_2NCSNHR^4$ (wherein $R^4$ is hereinbefore defined) under the reaction conditions described in (iii) above.

(c) Reaction of compounds of the general formula:

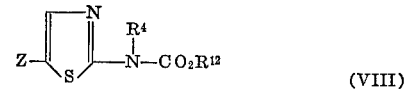

(VIII)

(wherein $R^4$ and Z are as hereinbefore defined and $R^{12}$ represents a lower alkyl group of 1 to 6 carbon atoms or, preferably, an aryl group, and more particularly a phenyl group) with an amine of the general formula:

$HNR^5R^6$ (IX)

(wherein $R^5$ and $R^6$ are as hereinbefore defined), preferably in the presence of an inert organic solvent, for example a lower alkanol, e.g. ethanol or, preferably, an aromatic hydrocarbon, e.g. benzene. Reaction may be carried out at ambient temperature and atmospheric pressure or, if desired, under pressure or, if desired, under pressure and at an elevated temperature.

The compounds of general Formula VIII may be prepared by the reaction of compounds of general Formula V with compounds of the general formula:

$R^{12}O_2CX^3$ (X)

(wherein $R^{12}$ is as hereinbefore defined and $X^3$ represents a chlorine or bromine atom) in the presence of an acid binding agent, e.g. pyridine, and if desired in the presence of an inert organic solvent, for example a ketone, e.g. acetone.

Compounds of general Formula VIII wherein Z represents a bromine, chlorine or iodine atom may also be prepared by the bromination, chlorination or iodination, by known methods, for example the procedures hereinbefore described in (a), of compounds of general Formula VIII wherein Z represents a hydrogen atom.

(d) Reaction of compounds of the general formula:

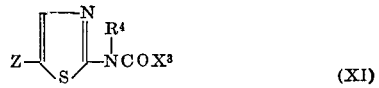
(XI)

(wherein $R^4$, $X^3$ and Z are as hereinbefore defined) with an amine of general Formula IX (wherein $R^5$ and $R^6$ are as hereinbefore defined), preferably in an inert organic solvent, for example an aromatic hydrocarbon, e.g. toluene, a halogenated aliphatic hydrocarbon, e.g. chloroform, a ketone, e.g. acetone or a lower alkanol, e.g. ethanol, and in the presence of a suitable acid-binding agent, e.g. sodium carbonate, triethylamine or an excess of the amine reactant.

Compounds of general Formula XI may be prepared by known methods, for example by reaction of compounds of general Formula V with phosgene, preferably in the presence of an inert organic solvent, for example an ether, e.g. diethyl ether, or an aromatic hydrocarbon, e.g. toluene, in the presence of a suitable acid-binding agent, e.g. triethylamine.

Compounds of general Formula XI wherein Z represents a bromine, chlorine or iodine atom may also be prepared by the bromination, chlorination or iodination by known methods, for example, the procedures hereinbefore described in (a), of compounds of general Formula XI wherein Z represents a hydrogen atom.

(e) When $R^5$ represents a methyl group, reaction of compounds of general Formula V with compounds of the general formula:

(XII)

(wherein $X^3$ and $R^6$ are as hereinbefore defined) in the presence of an acid binding agent, for example pyridine, which may also serve as solvent for the reaction, or triethylamine, and if desired in the presence of an inert organic solvent, for example a ketone, e.g. acetone.

(f) Reaction of compounds of general Formula V with compounds of the general formula:

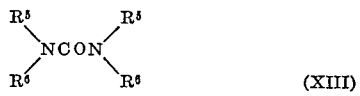
(XIII)

(wherein $R^5$ and $R^6$ are as hereinbefore defined) at elevated temperatures, e.g. 150–250° C., preferably in the presence of an inert organic solvent, for example an inert hydrocarbon solvent of boiling point 150–250° C.

(g) Treatment of compounds of the general formula:

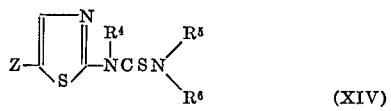
(XIV)

(wherein the various symbols are as hereinbefore defined) by known methods for converting a thioureido moiety to a ureido moiety, for example by treatment with a lead or mercuric compound, e.g. lead nitrate or mercuric oxide.

Compounds of general Formula XIV may be prepared by processes analogous to processes (a) to (f) in which the ureido moiety present or formed during the reaction sequence in replaced by a thioureido moiety.

(h) When $R^5$ represents a methyl group, reaction of compounds of the general formula:

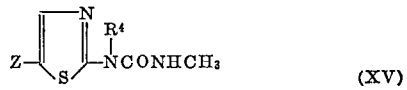
(XV)

(wherein $R^4$ and Z are as hereinbefore defined) with compounds of the general formula:

(XVI)

(wherein $R^6$ and T are as hereinbefore defined), preferably in the presence of an inert organic solvent, for example dimethylformamide, in the presence of a suitable basic condensing agent, for example an alkali metal hydride, e.g. sodium hydride.

(i) When $R^5$ represents a methyl group, reaction of compounds of the general formula:

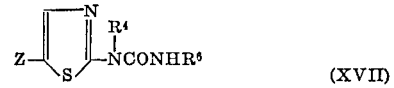
(XVII)

(wherein Z, $R^4$ and $R^6$ are as hereinbefore defined) with compounds of the general formula:

$$CH_3T \qquad (XVIII)$$

(wherein T is as hereinbefore defined) under the conditions hereinbefore described in (h).

(j) When $R^4$, $R^5$ and $R^6$ each represent a methyl group, reaction of compounds of the general formula:

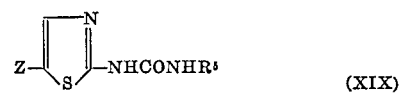
(XIX)

(wherein $R^5$ and Z are as hereinbefore defined) with compounds of Formula XVIII, under the conditions hereinbefore described in (h).

(k) When $R^4$ and $R^5$ each represent a methyl group, reaction of compounds of the general formula:

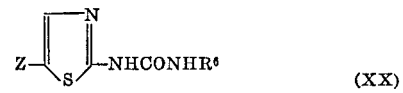
(XX)

(wherein $R^6$ and Z are as hereinbefore defined) with compounds of Formula XVIII, under the conditions hereinbefore described in (h).

Compounds of general Formulae XV and XVII may be prepared by methods (a) to (g) hereinbefore described. Compounds of general Formulae XIX and XX may be prepared by methods (a) to (g) as hereinbefore described but using thiazole derivatives wherein $R^4$ represents a hydrogen atom.

It will be appreciated that in the aforedescribed methods (c) to (i) the values of $R^4$, $R^5$ and $R^6$ must be selected so as to give the defined values of these symbols in the products of general Formula II.

Acid addition salts of compounds of general Formula II may be prepared by treatment of the base with a strong acid, for example a mineral acid e.g. a hydrohalic acid, for example hydrochloric or hydrobromic acid, or a strong organic acid, e.g. toluene-p-sulphonic acid, benzenesulphonic acid or methanesulphonic acid, in a suitable solvent, for example a halogenated hydrocarbon, e.g. chloroform, a ketone, e.g. acetone, or a lower alkanol, e.g. ethanol. The salts may be isolated by crystallisation, if necessary after concentration of the reaction medium.

Acid addition salts of compounds of Formula II may be isolated directly from the reaction medium in which they have been prepared without isolation of the base, by treatment with a strong acid.

When the reaction has been a bromination, chlorination or iodination, the hydrogen halide liberated during the reaction forms an acid addition salt with the compound of Formula II, which may be isolated as such. When the bromination, chlorination or iodination has been carried out in acetic acid, the salt isolated may contain acetic acid. Acetic acid itself is not, however, a sufficiently strong acid to from salts of the compounds of Formula II directly.

The following examples illustrate the preparation of the new thiazole derivatives of the present invention.

Example 1.—1-(5-bromothiazol-2-yl)-1,3-dimethylurea

A solution of bromine (2.35 ml.) in dry chloroform (5 ml.) was added over 30 minutes to a stirred ice-cooled solution of 1,3-dimethyl-1-(thiazol-2-yl)urea (8 g.) in dry chloroform (45 ml.) When the addition has been completed, the ice-bath was removed and stirring was continued for a further 30 minutes. The insoluble material was collected, washed with chloroform and dried in vacuo over silica gel to give 1-(5-bromothiazol-2-yl)-1,3-dimethylurea hydrobromide, M.P. 212–213° C. (with decomposition). This material was then boiled with water (350 ml.) and 2 N sulphuric acid (10 ml.). The hot solution was decanted from insoluble material and cooled to give 1 - (5 - bromothiazol-2-yl)-1,3-dimethylurea (3.7 g.) as a white solid, M.P. 122–124° C.

The 1,3-dimethyl-1-(thiazol-2-yl)urea used as starting material was prepared as follows:

Solutions of 2-methylaminothiazole (11.4 g., prepared according to Wilson and Woodger, J. Chem. Soc., 1955, 2946) in dry acetone (50 ml.) and methyl isocyanate (5.7 g.) in dry acetone (20 ml.) were mixed. When the mildly exothermic reaction had subsided, the mixture was heated under reflux for 1 hour. The acetone was then allowed to evaporate and the residual solid was crystallised from water (180 ml.) to give 1,3-dimethyl-1-(thiazol-2-yl)urea as a white solid, M.P. 100–101° C.

Example 2.—1-(5-bromothiazol-2-yl)-1,3-dimethylurea

A solution of methyl isocyanate (0.57 g.) in dry acetone (1 ml.) was added to a solution of crude 5-bromo-2-methylaminothiazole (1.9 g.) in dry acetone (10 ml.). When the mildly exothermic reaction had subsided, the mixture was heated under reflux on the steam bath for 2½ hours. The acetone was allowed to evaporate and the residual sticky solid was triturated with petroleum spirit (B.P. 40–60° C.) and then boiled with petroleum spirit (25 ml., B.P. 80–100° C.). The hot solution was decanted from insoluble material and cooled to give 1-(5-bromothiazol-2-yl)-1,3-dimethylurea (1.2 g.) as a white solid, M.P. 121–122° C., unaltered by the admixture of material prepared as described in Example 1.

The crude 5-bromo - 2 - methylaminothiazole used as starting material was prepared as follows:

Bromine (16 g.) was introduced over 50 minutes by means of a stream of air into a stirred mixture of 2-methylaminothiazole (11.4 g.), concentrated (48%) hydrobromic acid (125 ml.) and water (40 ml.) maintained at 13–16° C. by external cooling with water as necessary. The resulting solution was then boiled, under reflux, for 5 minutes and cooled to 0° C., this temperature being maintained overnight. The pH of the solution was then brought to 7 by addition first of solid sodium carbonate and then of solid sodium bicarbonate with external cooling (ice-water) and stirring. The precipitate was collected, washed with ice-water and dried in vacuo over silica gel to give crude 5-bromo-2-methylaminothiazole (6.2 g.).

Example 3.—1-(5-chlorothiazol-2-yl)-1,3-dimethylurea

A solution of sulphuryl chloride (9.9 ml. in dry chloroform (10 ml.) was added over 30 minutes to a stirred solution of 1,3-dimethyl-1-(thiazol - 2 - yl)urea (18.4 g., prepared as described in Example 1) in dry chloroform (100 ml.) maintained at 20–25° C. by external cooling with water as necessary. When the addition had been completed, the solution was stirred for a further 1½ hours at ambient temperature. The chloroform was then allowed to evaporate and the residual material was extracted with water. The pH of the aqueous extracts was brought to 7 by the addition of solid sodium bicarbonate with stirring and external cooling (ice-water). The mixture was then extracted with chloroform and the solid obtained on evaporation of the chloroform extracts to dryness was crystallised from hexane to yield 1-(5-chlorothiazol-2-yl)-1,3-dimethylurea as a white solid, M.P. 115–117° C.

Example 4.—1-(5-bromothiazol-2-yl)-1-ethyl-3-methylurea

A solution of bromine (1.17 ml.) in dry chloroform (5 ml.) was added over 15 minutes to a stirred, ice-cooled solution of 1-ethyl-3-methyl-1-(thiazol-2-yl)urea (3.7 g.) in dry chloroform (20 ml.). After stirring for a further hour at ambient temperature, the solution was shaken with excess aqueous sodium bicarbonate solution and then with water. The chloroform was removed by evaporation under reduced pressure and the residual dark-coloured, slightly oily, solid was crystallised from benzene (30 ml.) to give 1-(5-bromothiazol - 2 - yl)-1-ethyl-3-methylurea (0.95 g.), M.P. 127–128° C.

The 1-ethyl-3-methyl-1-(thiazol-2-yl)urea used as starting material was prepared as follows:

Methyl isocyanate (8.9 g.) was added to a solution of 2-ethylaminothiazole (20 g., prepared according to Kay and Parris, J. Org. Chem., 1952, 17, 737) in dry acetone (130 ml.). When the mildly exothermic reaction had subsided, the solution was heated under reflux on the steam bath for 3 hours. The acetone was then removed by distillation under reduced pressure and the residual solid was crystallised from benzene (6.5 ml.) to give 1-ethyl-3-methyl-1-(thiazol-2-yl)urea (11.9 g.) as an off-white solid, M.P. 101–102 C.

Example 5.—1-(5-bromothiazol-2-yl)-1,3,3-trimethylurea

A solution of bromine (1.6 g.) in dry chloroform (10 ml.) was added dropwise, during 20 minutes, to a stirred solution of 1-(thiazol-2-yl)-1,3,3-trimethylurea (1.85 g.) in dry chloroform (10 ml.) cooled in an ice-bath, at such a rate that the temperature of the mixture did not rise above 10° C. When the addition was complete, the mixture was stirred at room temperature for 2 hours. The chloroform was then removed in vacuo on the rotary evaporator at 10 to 20 mm. Hg and the residual glass triturated with diethyl ether to give crude 1-(5-bromothiazol-2-yl)-1,3,3-trimethylurea hydrobromide (3.2 g.) as a cream coloured powder. This was triturated with excess saturated aqueous sodium bicarbonate solution, collected, washed with water and dried in vacuo over silica gel to give 1-(5-bromothiazol-2-yl)-1,3,3-trimethylurea (2.1 g.) as a white solid with a melting point of 67° C. The melting point was increased to 69° C. by recrystallisation from hexane.

The 1-(thiazol-2-yl)-1,3,3-trimethylurea used as starting material was made as follows:

A mixture of phenyl N-methyl-N-thiazol-2-yl-carbamate (17 g.) and a solution of dimethylamine (30% w./w., 140 ml.) in ethanol was kept at room temperature for 36 hours, the ethanol was then removed in vacuo on the rotary evaporator at 10–20 mm. Hg and the residual oil steam-distilled until all traces of phenol were removed. The water was then removed from the resulting aqueous solution by evaporation on the rotary evaporator at 10 to 20 mm. Hg and the residual brown oil was dissolved in chloroform. The chloroform solution was dried over magnesium sulphate and distilled to give 1-(thiazol-2-yl)-1,3,3-trimethylurea (7.9 g.) as a colourless oil, collected at 120 to 122° C. at 0.25 mm. Hg.

The phenyl N-methyl-N-thiazol-2-yl-carbamate used as starting material was prepared as follows:

Phenyl chloroformate (18 g.) was added dropwise to a stirred solution of 2-methylaminothiazole (11.4 g.) (Wilson and Woodger, J. Chem. Soc., 1955, 2944) in dry pyridine (60 ml.), cooled in an ice bath so that the temperature did not exceed 10° C. When the addition was complete, the mixture was kept at room temperature for 65 hours. It was then diluted with a mixture of ice and water and the precipitated crude phenyl N-methyl-N-thiazol-2-yl-carbamate collected, successively washed with water, dilute aqueous hydrochloric acid and water, and dried in vacuo over silica gel to give a white solid (21.6 g.). Its melting point was 83–86° C. and was raised to 89° C. by recrystallisation from hexane.

Example 6.—1-(5-bromothiazol-2-yl)-1,3-dimethylurea

Methyl isocyanate (290 g.) was added dropwise, during ninety minutes, to a stirred mixture of 2-methylaminothiazole (570 g.), acetonitrile (1200 ml.) and triethylamine (5 ml.). The reaction temperature rose spontaneously from 19° C. to 51° C. The reaction mixture was then warmed and stirred at 60–65° C. for three hours. The solvent was then distilled off on the water pump, the distillation temperature being kept below 45° C. The residue solidified.

The melting point of the residue was 98–100° C. The residue was dissolved in glacial acetic acid (4 litres) and the solution stirred in an ice-bath to reduce the temperature to 12° C. Bromine (800 g.) in glacial acetic acid (500 ml.) was then added dropwise to the solution during ninety minutes. The reaction temperature rose spontaneously to 27° C., the reaction mixture was then stirred without heating for fifteen hours and filtered. The residue was washed with glacial acetic acid (3 litres) and sucked dry on the filter. The residue was then stirred with water (4 litres) while sodium bicarbonate (2 kg.) was added in portions over two and a half hours. The reaction mixture was then stirred for four hours, filtered and the residue washed with water (6 litres) and dried in a current of warm air to give 1 - (5-bromothiazol-2-yl)-1,3-dimethylurea (1070 g.) as a white solid, M.P. 118–120° C.

Example 7.—1-(5-bromothiazol-2-yl)-1,3-dimethylurea

A solution of bromine (6.88 ml.) in glacial acetic acid (20 ml.) was added dropwise to a stirred solution of 1,3-dimethyl-1-(thiazol-2-yl)urea (20 g.; prepared as described in Example 1) in glacial acetic acid (80 ml.), the reaction temperature being kept at 20–30° C. After the addition was complete, the reaction mixture was stirred for fourteen hours at ambient temperature. The precipitate was then filtered off, washed with diethyl ether and dried in vacuo at laboratory temperature. Aqueous sodium bicarbonate solution was added to the solid, followed by solid sodium bicarbonate until no further reaction could be observed. The solid was then removed by filtration, washed with water and dried in vacuo over phosphous pentoxide to give 1 - (5-bromothiazol-2-yl)-1,3-dimethylurea (25.26 g.) as a white solid, M.P. 120–121° C.

Alternative procedures used to prepare the 1,3-dimethyl-1-(thiazolyl)urea starting material used in the above preparation were:

(a) Methyl isocyanate (300 ml.) was added over 30 minutes to a mechanically stirred solution of 2-methylaminothiazole (570 g.) in acetonitrile (1.5 litres) which was maintained below 30° C. by cooling with cold water. The reaction mixture was then stirred at 60° C. (bath temperature) for four hours. As much acetonitrile as possible was then removed by distillation under reduced pressure (20 mm. Hg) at 60° C. (bath temperature). The brown oil obtained was allowed to solidify, broken up and dried in a vacuum oven at 35° C./20 mm. Hg for four hours and then coarsely powdered by passing through a 30-mesh sieve. The powder was then stirred with water (700 ml.) and the insoluble material was collected, washed with water (100 ml.) and dried, first in air and finally in vacuo over silica gel, to give 1,3-dimethyl-1-(thiazol-2-yl)urea (619 g.) in the form of a gleaming white powder, M.P. 100–102° C.

(b) A mixture of phenyl N-methyl-N-thiazol-2-yl-carbamate (3 g.; prepared as described in Example 5) and ethanolic monomethylamine (30 ml. of a 30% w./w. solution) was allowed to stand at laboratory temperature for six days. The ethanol was then removed by evaporation on the rotary evaporator at a bath temperature of 35° C. and the residual oil steam-distilled until free from phenol. The aqueous solution obtained was evaporated to dryness on the rotary evaporator and the residual solid treated with decolourizing charcoal and recrystallized from water to give 1,3 - dimethyl-1-(thiazol-2-yl)urea (0.4 g.), M.P. 101.5° C.

(c) Aqueous monomethylamine (5.8 ml. of a 21.4% w./v. solution) was added dropwise, with stirring, to a solution of N-methyl-N-(thiazol-2-yl)carbamoyl chloride (3.4 g.) in acetone (10 ml.). Stirring was continued for 15 minutes and the acetone was then evaporated under reduced pressure. The residue was collected by filtration, washed with water and recrystallized from water to give 1,3-dimethyl-1-(thiazol-2-yl)urea (2.9 g.), in the form of an off-white solid, M.P. 99–103° C.

The N-methyl-N-(thiazol - 2 - yl)carbamoyl chloride, used as starting material in the above preparation, was prepared as follows:

A solution of 2-methylaminothiazole (56 g.) and triethylamine (49.4 g.) in dry diethyl ether (300 ml.) was added, over one hour, to a stirred, saturated solution of phosgene in dry diethyl ether (250 ml.) at 0° C. The reaction mixture was stirred at 15° C. for 18 hours and then heated under reflux for 24 hours. Dry diethyl ether (500 ml.) was added and the reaction mixture was distilled, approximately 500 ml. of distillate being collected. Dry diethyl ether (1 litre) was added to the residue. The suspension obtained was filtered and the residue was washed with dry diethyl ether (1 litre). The filtrate and washings were combined and the diethyl ether evaporated to give N-methyl-N-(thiazol - 2-yl)carbamoyl chloride (46.1 g.), M.P. 51–52° C.

Example 8.—1 - (5 - bromothiazol-2-yl)-1,3-dimethylurea

An aqueous solution of monomethylamine (2.9 ml. of 21.4% w./v. solution) was added dropwise with stirring to a solution of N-(5 - bromothiazol-2-yl)-N-methylcarbamoyl bromide (2.6 g.; containing a small proportion of the corresponding carbamoyl chloride) in acetone (13 ml.). A slightly exothermic reaction took place. Stirring was continued for 15 minutes and the acetone was then removed under reduced pressure. The precipitate was filtered off, washed well with water, dried and recrystallized from water to give 1 - (5-bromothiazol-2-yl)-1,3-dimethylurea (1.86 g.), M.P. 122–123° C.

The N-(5-bromothiazol-2-yl)-N-methylcarbamoyl bromide, used as starting material in the above preparation, was prepared as follows:

Bromine (16.0 g.) was added over 30 minutes to a stirred solution of N-methyl-N-(thiazol-2-yl)carbamoyl chloride (17.7 g.; prepared as described in Example 7) in 1,2-dichloroethane (350 ml.). The bright yellow reaction mixture was then heated under reflux with stirring, for 3 hours, with copious evolution of hydrogen chloride and hydrogen bromide. The solvent was then removed under reduced pressure to give N-(5-bromothiazol-2-yl)-N-methylcarbamoyl bromide (24.9 g.) in the form of a pale yellow solid, M.P. 85.5–88.0 C., which contains some N-(5-bromothiazol-2-yl)-N-methylcarbamoyl chloride.

Example 9.—1-(5-bromothiazol-2-yl)-1,3-dimethylurea hydrobromide acetate

A solution of bromine (3.44 ml.) in glacial acetic acid (10 ml.) was added dropwise to a stirred solution of 1,3-dimethyl-1-(thiazol-2-yl)urea (10 g.; prepared as described in Example 1) in glacial acetic acid (20 ml.), the temperature been maintained at 0–5° C. The reaction mixture was stirred for one hour at laboratory temperature and the precipitate was then filtered off, washed with diethyl ether and dried in vacuo to give 1-(5-bromothiazol-2-yl)-1,3-dimethylurea hydrobromide acetate (21 g.), M.P. 214° C.

Example 10.—1-(5-bromothiazol-2-yl)-1,3-dimethylurea hydrobromide

Aqueous hydrobromic acid (5.72 ml.; 50% w./w. solution) was added dropwise to a stirred solution of 1-(5-bromothiazol-2-yl)-1,3-dimethylurea (13.5 g.; prepared as described in Example 1) in chloroform (50 ml.). The precipitate was collected by filtration and dried in vacuo to give 1-(5-bromothiazol-2-yl)-1,3-dimethylurea hydrobromide (15.24 g.), M.P. 213–214° C. (with decomposition).

Example 11.—1-(5-chlorothiazol-2-yl)-1,3-dimethylurea

A solution of methyl isocyanate (5.7 ml.) in acetonitrile was added over five minutes at 20–30° C. to a stirred, water-cooled, suspension of 5-chloro-2-methylaminothiazole (1 2g.) in acetonitrile (60 ml.). By the end of the addition, a turbid solution had formed, which was then heated for one hour at 45–50° C. with stirring. The solution was then concentrated at 30° C. under reduced pressure to give a brown solid, which was then dissolved in hot water (1 litre). Sufficient sodium metabisulphite was then added to decolourize the solution, which was then cooled to −10° C. and allowed to warm to ambient temperature. Precipitated, slightly impure 1-(5-chlorothiazol-2-yl)-1,3-dimethylurea (4.8 g.) was collected by filtration and treated with decolourizing charcoal and recrystallized from n-hexane (450 ml.) to give 1-(5-chlorothiazol-2-yl)-1,3-dimethylurea (3.2 g.) in the form of a white crystalline solid, M.P. 118–118.5° C.

The 5-chloro-2-methylaminothiazole used as starting material was prepared as follows:

A solution of sulphuryl chloride (29.4 g.) in dry chloroform (100 ml.) was added over 40 minutes at 10–20° C. to a stirred, ice-cooled solution of N-methyl-2-acetamidothiazole (50 g.) in dry chloroform (300 ml.). When the addition was complete, the ice-bath was removed and stirring was continued for a further hour. The insoluble material was collected, washed on the filter with chloroform and dried to give N-methyl-2-acetamido-5-chlorothiazole hydrochloride (61.5 g.) in the form of a white solid, M.P. 145–150° C., which was triturated with sodium bicarbonate and ice, washed with water and dried to give N-methyl-2-acetamido-5-chlorothiazole (32.5 g.), M.P. 73° C. The latter was mixed with 10% w./v. aqueous hydrochloric acid (340 ml.) and heated under reflux for 20 minutes. Decolourizing charcoal was then added and the mixture refluxed for a further 10 minutes. The mixture was filtered, cooled and, with continued cooling, neutralized at 9–10° C. to pH 6 with solid sodium carbonate (80 g.). The insoluble material was collected, washed once with water and dried in a desiccator at 0° C. to give 5-chloro-2-methylaminothiazole (11.1 g.) in the form of a white solid (going pink on storage at 0° C.), M.P. 75–77° C.

The N-methyl-2-acetamidothiazole used as starting material in the above preparation may be prepared according to the following procedure:

Warm, molten 2-methylaminothiazole (57 g.) was added slowly, and in portions, to stirred acetic anhydride (59 ml.). The first addition was of 5–10 ml., after which the temperature rose slowly to 58° C. The rest of the addition was over 10 minutes at 75–80° C. When the addition was complete, the mixture was heated on the steam bath for two hours and poured into ice-water (1 litre). The insoluble material was collected, washed with ice-water and dried to give N-methyl-2-acetamidothiazole (42.3 g.) in the form of a white solid, M.P. 89° C.

Example 12.—1-(5-chlorothiazol-2-yl)-1,3-dimethylurea

A solution of freshly distilled sulphuryl chloride (162 ml.) in dry sym-tetrachloroethane (400 ml.) was added dropwise over eight hours to a filtered, mechanically stirred solution of 1,3-dimethyl-1-(thiazol-2-yl)urea (342 g.; prepared as described in Example 1 or 7) in dry sym-tetrachloroethane (1 litre) which was maintained at 0–5° C. by cooling in a solid carbon dioxide/acetone bath. The reaction mixture was kept at 0° C. for 64 hours and then maintained at 60° C. (bath temperature) for 18 hours. The reaction mixture was cooled and filtered. The white residue was washed on the filter with dry sym-tetrachloroethane (3× 100 ml.) followed by dry diethyl ether (6× 250 ml.). After drying in vacuo over silica gel, the solid (174 g.) was stirred with water (200 ml.) and the pH of the aqueous phase was brought to 2 by the gradual addition of aqueous 2 N sodium carbonate solution (670 ml.). The insoluble white solid was collected, washed with water (120 ml.) and dried in vacuo over silica gel to give 1-(5-chlorothiazol-2-yl)-1,3-dimethylurea (124 g.) in the form of a white solid, M.P. 118–120° C.

The sym-tetrachloroethane mother liquors and washings were combined and extracted with 6 N hydrochloric acid (2× 500 ml.). The combined acid extracts were shaken with charcoal, filtered and mechanically stirred whilst sodium bicarbonate (500 g.) was added until the pH was 2. The precipitated crude 1-(5-chlorothiazol-2-yl)-1,3-dimethylurea (129 g.), M.P. 114–119° C., was collected, washed with water and dried.

Further extraction of the sym-tetrachloroethane mother liquors with 6 N hydrochloric acid (2× 500 ml.) and treatment of the acid extracts as described above gave further crude 1-(5-chlorothiazol-2-yl)-1,3-dimethylurea (10 g.), M.P. 117–120° C.

The total crude 1-(5-chlorothiazol-2-yl)-1,3-dimethylurea (139 g.) was dissolved in 2 N hydrochloric acid (2.1 litres). The solution was then treated with charcoal, filtered and the pH of the filtrate brought to 2 by the gradual addition of sodium bicarbonate (about 300 g.) with mechanical stirring. The precipitate was collected, washed with water and dried to give 1-(5-chlorothiazol-2-yl)-1,3-dimethylurea (124 g.), M.P. 118–120° C.

Example 13.—1-(5-chlorothiazol-2-yl)-1,3-dimethylurea

A solution of monomethylamine (1.15 g.) and phenyl N-(5-chlorothiazol-2-yl)-N-methylcarbamate (4 g.) in dry benzene (60 ml.) was allowed to stand at laboratory temperature in a stoppered flask for two days. The reaction mixture was then steam distilled until no more phenol was present in the distillate and the remaining aqueous solution concentrated in vacuo to give a white solid (1.9 g.), which was then dissolved in 2 N hydrochloric acid (100 ml.). The pH of the solution was brought to 3 by the addition of solid sodium bicarbonate. The precipitated solid was filtered off and dried to give 1-(5-chlorothiazol-2-yl)-1,3-dimethylurea (1.42 g.), M.P. 117–119° C.

The phenyl N-(5-chlorothiazol-2-yl)-N-methylcarbamate used as starting material in the above preparation was prepared as follows:

A solution of sulphuryl chloride (2 ml.) in dry chloroform (20 ml.) was added over half an hour to a stirred solution of phenyl N-methyl-N-(thiazol-2-yl)-carbamate (5 g.) in dry chloroform (50 ml.) at 0° C. The reaction mixture was allowed to stand for 20 hours at 15° C. and then washed successively with aqueous 2 N sodium bicarbonate solution and water. The organic layer was separated and evaporated under reduced pressure to give crude phenyl N-methyl-N-(5-chlorothiazol-2-yl)carbamate, M.P. 104–106° C., which was twice recrystallized from a mixture of acetone and petroleum spirit (B.P. 60–80° C.) to give phenyl N-methyl-N-(5-chlorothiazol-2-yl) carbamate (1.5 g.), M.P. 119° C.

The phenyl N-methyl-N-(thiazol-2-yl)carbamate used as starting material in the above preparation was prepared as follows:

Phenyl chloroformate (360 g.) was added over one hour to an ice-cooled, mechanically stirred solution of 2-methylaminothiazole (228 g.) in dry pyridine (1.2 litres).

The reaction mixture was then stirred for a further two hours without cooling and allowed to stand overnight at laboratory temperature. After filtration, the solid part of the reaction mixture was washed successively with water (200 ml.), 2 N hydrochloric acid (75 ml.) and water (100 ml.) and dried in vacuo over silica gel to give an impure product (A) (20 g.), M.P. 55–80° C. The liquid part of the reaction mixture was slowly added to manually stirred ice water (3 litres). A slightly sticky solid separated which rapidly hardened on further stirring and was collected, washed successively with water (650 ml.), 2N hydrochloric acid (500 ml.) and water (650 ml.) and dried, initially in air and finally in vacuo over silica gel to give a product (B) (425 g.), M.P. 78–81° C. after previous sintering. All the aqueous liquors obtained in the isolation of (B) were combined and on standing for two days gradually deposited further solid material, which was collected, washed with water and dried to give a product (C) (16 g.), M.P. 78–87° C. after previous sintering.

Product (A) was passed through a 40-mesh sieve and stirred with diethyl ether (30 ml.). The solid was filtered off, washed on the filter with diethyl ether (50 ml.), and dried. The resulting solid (9 g.), M.P. 84–85° C., was combined with (B) and (C) and the whole passed through a 40-mesh sieve and stirred with cyclohexane (400 ml.). After filtration, the residue was washed on the filter with cyclohexane (600 ml.) and dried in air to give phenyl N-methyl-N-(thiazol-2-yl)carbamate (495 g.) in the form of a pale yellow crystalline powder, M.P. 82–85° C., which was sufficiently pure for further use as an intermediate.

Example 14.—1-(5-chlorothiazol-2-yl)-1,3-dimethylurea

An excess of ethanolic monomethylamine (30% w./w. solution) was added to a small sample of N-(5-chlorothiazol-2-yl) N-methylcarbamoyl chloride (ca. 100 mg.) dissolved in ethanol (ca. 5 ml.). The reaction mixture was allowed to stand for 16 hours at 15° C. The ethanol was then removed by evaporation under reduced pressure to give 1-(5-chlorothiazol-2-yl)-1,3-dimethylurea, M.P. 115° C.

The N-(5-chlorothiazol-2-yl)-N-methylcarbamoyl chloride used as starting material in the above preparation was prepared as follows:

A solution of chlorine (6.2 g.) in 1,2-dichloroethane (100 ml.) was added to a solution of N-methyl-N-(thiazol-2-yl)carbamoyl chloride (15.38 g.; prepared as described in Example 7) in 1,2-dichloroethane (100 ml.) and the reaction mixture was allowed to stand for one hour at 17° C. The solid precipitate was removed by filtration, washed with a little cold 1,2-dichloroethane and dried in vacuo to give N-(5-chlorothiazol-2-yl)-N-methylcarbamoyl chloride (8.35 g.), M.P. 98° C.

Example 15.—1,3-dimethyl-1-(5-iodothiazol-2-yl)urea

A solution of 1,3-dimethyl-1-(thiazol-2-yl)urea (10.27 g.; prepared as described in Example 1) in a mixture of ethanol (90 ml.), concentrated sulphuric acid (12 ml.) and water (75 ml.) was added over 15 minutes to a stirred solution of potassium iodide (8.7 g.) and potassium iodate (5.49 g.) in water (150 ml.) at 55° C. The reaction mixture was then stirred at 52–58° C. for a further 45 minutes. The solution was decanted so as to leave behind, as far as possible, some tarry material which had separated, filtered while still warm, cooled and the resulting precepitate filtered off to give 1,3-dimethyl-1-(5-iodothiazol-2-yl)urea (7.51 g.), M.P. 150–155° C. Concentration of the filtrate gave a second crop of the product (2.34 g.), M.P. 147–151° C. The two crops were combined and recrystallized twice from a mixture (1:1 by volume) of benzene and petroleum spirit (B.P. 80–100°) to give 1,3-dimethyl-1-(5-iodothiazol-2-yl)urea (6.5 g.), M.P. 153–155° C.

Example 16.—1-(5-iodothiazol-2-yl)-1,3-dimethylurea

A solution of iodine monochloride (437 g.) in glacial acetic acid (volume of solution 1986 ml.) was added, with stirring, over 1½ hours to a solution of 1,3-dimethyl-1-(thiazol-2-yl)urea (184.4 g.; prepared as described in Example 1) in glacial acetic acid (1 litre), the temperature of the reaction mixture not being allowed to rise above 25° C. The reaction mixture was then stirred at laboratory temperature for three hours. The yellow solid which had separated was filtered off, washed with petroleum spirit (B.P. 40–60° C.) and dried to give a solid (415 g.). By adding petroleum spirit (B.P. 60–80° C.; 2 litres) to the filtrate and allowing to stand overnight, a further quantity (39 g.) of slightly darker material was obtained. The two crops were combined, suspended in water (1 litre) and decolourized by the addition of sodium metabisulphite (4× 50 g.) in the minimum volume of water. The solid material, now cream-coloured, was filtered off, washed with water, and sucked dry on the filter and then suspended in saturated aqueous sodium bicarbonate solution (1.5 litres). After stirring for 1½ hours, the suspended solid was filtered off and dried in vacuo over silica gel to give impure 1-(5-iodothiazol-2-yl)-1,3-dimethylurea (262 g.), M.P. 148–154° C., which was recrystallized from a mixture (1:1 by volume) of benzene and petroleum spirit (B.P. 80–100° C.) to give 1-(5-iodothiazol-2-yl)-1,3-dimethylurea (225 g.), M.P. 152–154.5° C.

Example 17.—1-(5-bromothiazol-2-yl)-1-ethyl-3-methylurea

A solution of bromine (3.05 ml.) in glacial acetic acid (5 ml.) was added dropwise over 30 minutes to a mechanically stirred solution of 1-ethyl-3-methyl-1-(thiazol-2-yl)urea (11.1 g.; prepared as described in Example 4) in glacial acetic acid (30 ml.) which was maintained at a temperature below 10° C. by cooling in ice water. The reaction mixture was then stirred at laboratory temperature for a further 15 minutes. The solid which had separated was filtered off, washed on the filter with a little glacial acetic acid followed by dry diethyl ether and dried in vacuo over silica gel. The solid product (15 g.) was triturated with excess saturated aqueous sodium bicarbonate solution and the off-white insoluble solid was collected, washed with a little water and dried in vacuo over silica gel to give 1-(5-bromothiazol-2-yl)-1-ethyl-3-methylurea (9.2 g.), M.P. 124–125° C.

Example 18.—1-(5-chlorothiazol-2-yl-)-1-ethyl-3-methylurea

A solution of sulphuryl chloride (4.5 ml.) in dry chloroform (20 ml.) was added over half-an-hour to a stirred solution of 1-ethyl-3-methyl-1-(thiazol-2-yl)urea (9.25 g.; prepared as described in Example 4) in dry chloroform (30 ml.), the temperature of the reaction mixture being maintained below 26° C. The solution was then evaporated to dryness and the residue partitioned between saturated aqueous sodium bicarbonate solution and ethyl acetate. The ethyl acetate phase was separated, dried over sodium sulphate and the ethyl acetate evaporated under reduced pressure to give crude 1-(5-chlorothiazol-2-yl)-1-ethyl-3-methylurea (9.44 g.), M.P. 103–118° C., which was recrystallized from cyclohexane to give 1-(5-chlorothiazol 2-yl)-1-ethyl-3-methylurea (4.15 g.), M.P. 123.5–125.5° C.

Example 19.—1-(5-iodothiazol-2-yl)-1-ethyl-3-methylurea

A solution of iodine monochloride (39.0 g.) in glacial acetic acid (volume of solution 180 ml.) was added, with stirring, over one hour to a solution of 1-ethyl-3-methyl-1-(thiazol-2-yl)urea (14.8 g.; prepared as described in Example 4) in glacial acetic acid (80 ml.), the temperature not being allowed to rise above 15° C. The reaction mixture was then stirred at room temperature for three hours. The yellow solid (31.9 g.) which had separated was filtered off, suspended in a solution of sodium metabisulphite (12 g.) in water (100 ml.), stirred for 15 minutes and filtered. The precipitate was filtered off, washed with water and then suspended in saturated aqueous sodium bicarbonate solution (100 ml.), stirred for two hours and filtered to give crude 1-(5-iodo-thiazol-2-yl) - 1 - ethyl - 3 - methylurea (17.3 g.), M.P. 106–109° C., which was recrystallized from cyclohexane to give 1 - (5 - iodothiazol - 2 - yl) - 1 - ethyl - 3 - methylurea (15.5 g.), M.P. 111–112° C.

Example 20.—1-(5-bromothiazol-2-yl)-1,3,3-trimethylurea

A solution of bromine (79 ml.) in dry chloroform (500 ml.) was added dropwise over 75 minutes to a mechanically stirred solution of 1 - (thiazol - 2 - yl)-1,3,3-trimethylurea (286 g.) in dry chloroform (500 ml.) which was maintained below 10° C. by cooling in ice-water. When the addition had been completed, the reaction mixture was cooled to 0° C. and then added, over 75 minutes, to well-stirred, ice-cooled, anhydrous diethyl ether (2.6 litres). The precipitated, slightly sticky light brown solid was collected and dried in air. After passage through a 40-mesh sieve, this solid (503 g.) was stirred with dry acetone (500 ml.). The insoluble solid was collected, washed with acetone and dried in air. The resulting beige-coloured solid (465 g.) was then gradually added to well-stirred distilled water (2 litres). When the addition had been completed, stirring was continued for a further hour. The insoluble solid was then collected, thoroughly washed with water (2× 500 ml.) and dried, first in air and then in vacuo over silica gel, to give 1 - (5 - bromothiazol-2-yl)-1,3,3-trimethylurea (275 g.) in the form of an off-white solid, M.P. 68–69° C.

Treatment of the combined aqueous mother liquors and washings with sufficient 2 N aqueous sodium carbonate solution (1.25 litres) to bring the pH to 7, separation of the precipitated solid, washing with water and drying, first in air and then in vacuo over silica gel, gave a second crop of slightly less pure 1-(5-bromothiazol-2-yl-1,3,3-trimethylurea (36 g.), M.P. 68–69° C.

The 1-(thiazol - 2 - yl)-1,3,3-trimethylurea used as starting material in the above preparation was prepared as follows:

Phenyl N-methyl-N-(thiazol-2-yl)carbamate (415 g.; prepared as described in Example 13) was suspended in dry benzene (800 ml.) and dimethylamine (400 g.) was added with ice-cooling. The resulting solution was divided into portions and placed in glass pressure-bottles which were then sealed. The pressure-bottles were then heated on the steam bath for 12 hours. The contents of the pressure-bottles were then combined and the combined solutions steam distilled until all phenol had been removed (12 litres of distillate collected). Most of the water in the reaction mixture was then removed by distillation on the steam bath under reduced pressure (20 mm. Hg). The residual oil was dissolved in methylene chloride and the solution obtained was distilled to dryness under atmospheric pressure. Remaining traces of methylene chloride were removed by heating on the steam bath under reduced pressure (20 mm. Hg) to give 1-(thiazol-2-yl)-1,3,3-trimethylurea (286 g.) in the form of a brown oil which was used, without further purification, as starting material.

Alternative preparations which may be used to obtain 1 - (thiazol-2-yl)-1,3,3-trimethylurea suitable for use as starting material are:

(a) Sodium hydride (1.5 g.) was added to a solution of 1,3-dimethyl-1-(thiazol-2-yl)urea (8.55 g.; prepared as described in Example 1) in dimethylformamide (40 ml.) and the mixture stirred at ambient temperature for 24 hours. Methyl iodide (4.25 ml.) was then added to the solution and stirring continued for a further 15 minutes. The solvent was then removed by evaporation and the solid residue extracted with diethyl ether. The ethereal extracts were dried over sodium sulphate and concentrated to give 1-(thiazol-2-yl)-1,3,3-trimethylurea (6.0 g.) in the form of an orange-red oil.

(b) Aqueous dimethylamine (5.1 ml. of a 40% w./w. solution) was added, with stirring, to a solution of N-methyl-N-(thiazol-2-yl)carbamoyl chloride (4.0 g.; prepared as described in Example 7) in acetone (5 ml.). An exothermic reaction occurred and stirring was continued for 15 minutes. The acetone and water were then evaporated under reduced pressure. The residue was then extracted with diethyl ether (50 ml.), filtered and the solid washed with a further quantity of diethyl ether. The combined ethereal extract and washings were evaporated under reduced pressure to give 1 - (thiazol-2-yl)-1,3,3-trimethylurea (3.4 g.) in the form of a brown oil.

(c) A mixture of 2-methylaminothiazole (5.7 g.), triethylamine (5.0 g.) and dry toluene (30 ml.) was added over two hours to a mechanically-stirred solution of phosgene (20 ml.—measured at −20° C.) in dry toluene (30 ml.) which was maintained at 0–5° C. by external cooling in a solid carbon dioxide/acetone bath. The reaction mixture was then allowed to stand for three days at laboratory temperature and unreacted phosgene removed in a stream of dry nitrogen. The reaction mixture was filtered and a solution of dimethylamine (10 ml.—measured at −20° C.) in dry toluene (25 ml.) was then added to the mechanically stirred, ice-cooled filtrate. After being allowed to stand overnight at laboratory temperature, the reaction mixture was filtered and toluene removed from the filtrate under reduced pressure on the rotary evaporator to give 1-(thiazol-2-yl)-1,3,3-trimethylurea (3.1 g.) in the form of a brown oil.

Example 21.—1-(5-bromothiazol-2-yl)-1,3,3-trimethylurea

A solution of phenyl N-(5-bromothiazol-2-yl)-N-methylcarbamate (4.0 g.) and dimethylamine (1.44 g.) in dry benzene (60 ml.) was allowed to stand at laboratory temperature in a stoppered flask for two days. The reaction mixture was then steam-distilled until no more phenol was present in the distillate and the remaining aqueous solution concentrated in vacuo to give a white solid (2 g.) which was dissolved in 2 N hydrochloric acid (100 ml.). The pH of the solution was brought to 4 by the addition of solid sodium bicarbonate and the precipitate filtered off and recrystallized from petroleum spirit (B.P. 60–80° C.) to give 1 - (5 - bromothiazol-2-yl)-1,3,3-trimethylurea (1.2 g.), M.P. 67–68° C.

The phenyl N-(5-bromothiazol-2-yl)-N-methyl carbamate used as starting material in the above preparation was obtained as follows:

A solution of bromine (4.56 ml.) in chloroform (20 ml.) was added dropwise to a stirred mixture of phenyl N-methyl-N-(thiazol-2-yl)carbamate (20 g.; prepared as described in Example 5 or 13) and calcium carbonate (20 g.) in chloroform (400 ml.). The reaction mixture was stirred for a further hour and then filtered. The filtrate was washed successively with aqueous 2 N sodium bicarbonate solution (2× 50 ml.) and water (50 ml.), dried over sodium sulphate and evaporated to give phenyl N - (5-bromothiazol-2-yl)-N-methylcarbamate (25.07 g.), M.P. 114–116° C.

Example 22.—1-(5-bromothiazol-2-yl)-1,3,3-trimethylurea

Aqueous dimethylamine (2.25 ml. of a 40% w./w. solution) was added, with vigorous stirring, to a solution of N-(5-bromothiazol-2-yl)-N-methylcarbamoyl bromide (2.6 g.; prepared as described in Example 8) in acetone (13 ml.). Stirring was continued for 15 minutes at laboratory temperature and the acetone was then removed under reduced pressure. The precipitate was filtered off, washed thoroughly with water, dried in vacuo over silica gel and recrystallized from aqueous acetone to give 1-(5- bromothiazol - 2-yl)-1,3,3-trimethylurea (2.0 g.), in the form of fine white needles, M.P. 67.5–70° C.

Example 23.—1-(5-bromothiazol-2-yl)-1,3,3-trimethylurea

A solution of 1-(5-bromothiazol-2-yl)-1,3-dimethylurea (12.5 g.; prepared as described in Example 1, 2, 6, 7 or 8) in dry dimethylformamide (20 ml.) was added over two hours to a mechanically stirred mixture of methyl iodide (4.25 ml.) and sodium hydride (1.5 g.) in dry dimethylformamide (40 ml.). The reaction mixture was stirred overnight, the solvent removed and the residual solid extracted with chloroform. The chloroform extract was dried over sodium sulphate, concentrated, and the residue recrystallized from petroleum spirit (B.P. 60–80° C.) to give 1-(5-bromothiazol-2-yl)-1,3,3-trimethylurea (7.5 g.), M.P. 67–68° C.

Proceeding as described above but replacing the 1-(5-bromothiazol-2-yl)-1,3-dimethylurea by 1-(5-chlorothiazol-2-yl)-1,3-dimethylurea (prepared as described in Example 11, 12, 13 or 14) and replacing the methyl iodide by ethyl iodide or n-propyl iodide, there were obtained respectively 1-(5-chlorothiazol-2-yl)-1,3-dimethyl-3-ethylurea and 1-(5-chlorothiazol-2-yl)-1,3-dimethyl - 3 - n-propylurea.

Example 24.—1-(5-bromothiazol-2-yl)-1,3,3-trimethylurea

A solution of 1-(5-bromothiazol - 2-yl)-3 - methylurea (4.72 g.) in dry dimethylformamide (20 ml.) was added over two hours to a mechanically stirred mixture of methyl iodide (2.5 ml.) and sodium hydride (1 g.) in dry dimethylformamide (20 ml.). The reaction mixture was stirred overnight, the solvent removed in a current of warm air and the residual solid extracted with diethyl ether. The ethereal extracts were dried over sodium sulphate, concentrated and the residue recrystallized from petroleum spirit (B.P. 60–80° C.) to give 1-(5-bromothiazol-2-yl)-1,3,3-trimethylurea (1 g.), M.P. 67–68° C.

The 1-(5-bromothiazol-2-yl)-3-methylurea used as starting material in the above preparation may be obtained according to the following procedures:

(a) A solution of methylisocyanate (2.85 g.) in dry acetone (10 ml.) was added to a solution of 2-amino-5-bromothiazole (8.95 g.; prepared according to English et al., J. Amer. Chem. Soc., 1946, 68, 457) in dry acetone (25 ml.), during which time the temperature rose from 18° C. to 28° C. The mixture was then heated under reflux at 60–65° C. (bath temperature) for one hour and cooled. The white solid which separated was collected, washed with a little acetone and dried to give 1-(5-bromothiazol-2-yl)-3-methylurea (4.6 g.) A sample was crystallized from ethanol to give material of M.P. 204 C. (with decomposition).

(b) A stirred suspension of 3-methyl-1-(thiazol-2-yl)-urea (83 g.) in dry chloroform (500 ml.) was maintained at 20° C. (by external cooling with water, as necessary) during the addition, over 3 hours, of a solution of bromine (26.3 ml.) in dry chloroform (50 ml.). Halfway through the addition, no solid phase was present. When the addition had been completed, the mixture was stirred at ambient temperature for a further 1½ hours. The insoluble material was then collected, washed with chloroform and dried in vacuo over silica gel to give 1-(5-bromothiazol-2-yl)-3-methylurea hydrobromide (77 g.), M.P. 192–195° C. (with decomposition). This material was then thoroughly triturated with excess saturated aqueous sodium bicarbonate solution and the insoluble solid was collected, thoroughly washed with water and dried to give 1-(5-bromothiazol-2-yl)-3-methylurea (49 g.) as a buff solid. A sample was crystallized from methyl Cellosolve to give material of M.P. 206° C. (with decomposition).

Example 25.—1-(5-chlorothiazol-2-yl)-1,3,3-trimethylurea

A solution of sulphuryl chloride (13.6 ml.) in dry chloroform (15 ml.) was added over 15 minutes to a mechanically stirred, ice-cooled solution of 1-(thiazol-2-yl)-1,3,3-trimethylurea (27 g.; prepared as described in Example 5 or 20) in dry chloroform (100 ml.) The reaction mixture was allowed to stand overnight at laboratory temperature, the chloroform removed by evaporation under reduced pressure on the rotary evaporator (bath temperature 35° C.) and the residual brown gum taken up in ethanol (75 ml.). The ethanolic solution was diluted with anhydrous diethyl ether (120 ml.) and on standing deposited a fawn coloured solid which was collected, thoroughly washed with acetone and dried in vacuo over silica gel. The resulting solid (15.5 g.), M.P. 133–135° C., was dissolved in a little water and the resulting dark coloured solution was diluted with water (250 ml.) and thoroughly extracted with diethyl ether. The almost colourless ethereal extracts were successively washed with water, aqueous sodium bicarbonate solution and water and dried over magnesium sulphate. Evaporation of the diethyl ether, finally in vacuo over silica gel, gave 1-(5-chlorothiazol-2-yl)-1,3,3-trimethylurea (9.5 g.) in the form of a golden-yellow oil.

Example 26.—1-(5-iodothiazol-2-yl)-1,3,3-trimethylurea

A solution of iodine monochloride in acetic acid (110 ml. containing 24.2 g. of iodine monochloride) was added dropwise over 45 minutes to a well-stirred solution of 1-(thiazol-2-yl)-1,3,3-trimethylurea (14.1 g.; prepared as described in Example 5 or 20) in glacial acetic acid (15 ml.) cooled in a bath of cold water. Stirring was continued at laboratory temperature for a further 16 hours. The reaction mixture was then allowed to stand and the clear supernatant liquid was decanted. The dark-colored insoluble residue was shaken with a mixture of water (100 ml.), sodium metabisulphite (30 g.) and methylene chloride (150 ml.). The organic layer was separated and the methylene chloride was allowed to evaporate to give crude 1-(5-iodothiazol-2-yl)-1,3,3-trimethylurea (16 g.) in the form of a pale yellow solid, M.P. 118–121° C., after softening at 115° C. Treatment with decolourizing charcoal and recrystallization from cyclohexane (180 ml.) gave 1-(5-iodothiazol-2-yl)-1,3,3-trimethylurea (13 g.) in the form of glistening white platelets, M.P. 123–125° C.

Example 27.—1-(5-bromothiazol-2-yl)-1-ethyl-3,3-dimethylurea

A solution of 1-ethyl-3-methyl-1-(thiazol-2-yl) urea (22.7 g.; prepared as described in Example 4) in dimethylformamide (55 ml.) was added over half-an-hour, with stirring to a mixture of a 50% w./w. suspension of sodium hydride in oil (containing 7.36 g. of sodium hydride) in dimethylformamide (35 ml.) with cooling in a water bath to maintain the temperature at about 25° C. The reaction mixture was stirred for one hour and methyl iodide (11 ml.) was then added over half-an-hour. Stirring was continued for a further three hours. The solid which separated out was filtered off. The filtrate was evaporated under reduced pressure to constant weight and the non-volatile residue taken up in 2 N hydrochloric acid (100 ml.). The acid solution was extracted with benzene. The aqueous layer was neutralized with solid sodium bicarbonate and extracted with diethyl ether. Evaporation of the diethyl ether gave a dark brown oil (12.8 g.) which was then dissolved in chloroform (30 ml.). A solution of bromine (3.4 ml.) in chloroform (10 ml.) was added, with stirring, over half-an-hour to the chloroform solution, the temperature of the reaction mixture being maintained below 35° C. A little sodium metabisulphite was then added to the stirred reaction mixture to remove excess bromine and the reaction mixture filtered and the chloroform removed in vacuo. The residue was taken up in diethyl ether and saturated aqueous sodium bicarbonate solution. The ether layer was separated and the diethyl ether removed to give a dark brown oil (14.6 g.) which was dissolved in petroleum spirit (B.P. 60–80° C.) and the solution chromatographed on alumina (100 g. in a 2 cm. diameter column). The fraction eluted with benzene/10% diethyl ether was collected and distilled. The main fraction (3.87 g.), B.P. 103/0.12 mm. Hg, crystallized to a solid, M.P. 61–65° C., which was recrystallized from petroleum spirit (B.P. 60–80° C.) to give 1-(5-bromothiazol-2-yl)-1-ethyl-3,3-dimethylurea (2.73 g.), M.P. 65.5–67.5° C.

Proceeding as described above but replacing the bromine by sulphuryl chloride there was obtained 1-(5-chlorothiazol-2-yl)-1-ethyl-3,3-dimethylurea.

Example 28.—1-(5-bromothiazol-2-yl)-1,3-dimethyl-3-ethylurea

A solution of bromine (4 ml.) in dry chloroform (20 ml.) was added over one hour to a mechanically stirred solution of 1,3-dimethyl-3-ethyl-1-(thiazol-2-yl)urea (14 g.) in dry chloroform (30 ml.) and stirring continued for a further hour. The chloroform was then removed and the residual oil treated with saturated aqueous sodium bicarbonate solution. The oil was purified by dissolving in petroleum spirit (B.P. 60–80° C.) and column chromatography on silica gel (60 g. in a 2 cm. diameter column). The fractions eluted with petroleum spirit (B.P. 80–100° C.)/10% ethyl acetate were combined and distilled to give 1-(5-bromothiazol-2-yl)-1,3 - dimethyl - 3 - ethylurea (3.2 g.), B.P. 124–126° C./0.1 mm. Hg.

The 1,3-dimethyl-3-ethyl-1-(thiazol-2-yl)urea used as starting material in the above preparation may be prepared according to the following procedures:

(a) A mixture of 1,3-dimethyl-1-(thiazol - 2-yl)urea (17.1 g.; prepared as described in Example 1) and sodium hydride (3 g.) in dry dimethylformamide (80 ml.) was stirred at laboratory temperature for 24 hours. A solution of ethyl bromide (7.5 ml.) in dry dimethylformamide (20 ml.) was then added over 20 minutes and stirring continued for a further 30 minutes. The solvent was removed and the residue extracted with diethyl ether. The ethereal extracts were dried over sodium sulphate and concentrated to give 1,3-dimethyl-3-ethyl-1-(thiazol-2-yl)-urea (11 g.) in the form of a reddish oil.

(b) A solution of ethyl isocyanate (28.8) in acetonitrile (50 ml.) was added over 30 minutes to a mechanically stirred solution of 2-methylaminothiazole (45.2 g.) and trimethylamine (0.5 ml.) in acetonitrile (200 ml.) and the reaction mixture heated under reflux for four hours. The solvent was then removed to give 3-ethyl-1-methyl-1-(thiazol-2-yl)urea (70.6 g.) in the form of a red oil. This oil (37 g.) was mixed with sodium hydride (6 g.) and dry dimethylformamide (80 ml.) and stirred at laboratory temperature for 24 hours. A solution of methyl iodide (18 ml.) in dry dimethylformamide (20 ml.) was then added over 20 minutes and the reaction mixture stirred at laboratory temperature for one hour. The solvent was then removed and the residue extracted with diethyl ether. The etheral extract was dried and concentrated to give 1,3-dimethyl-3-ethyl-1-(thiazol-2-yl)urea (29.6 g.) in the form of an oil.

Example 29.—1-(5-bromothiazol-2-yl)-1,3-dimethyl-3-n-propylurea

A solution of bromine (4.9 g.) in dry chloroform (40 ml.) was added dropwise with stirring at 0° C. to a solution of 1,3-dimethyl-3-n-propyl-1-(thiazol-2-yl)urea (6.5 g.) in dry chloroform (40 ml.) The ice-bath was then removed and the reaction mixture stirred for 4 hours. The chloroform and unreacted bromine were then removed by evaporation under reduced pressure. The orange viscous oil obtained crystallized on standing overnight in the refrigerator. The solid was triturated with acetone to give 1-(5-bromothiazol-2-yl)-1,3-dimethyl-3 - n-propylurea hydrobromide (8.2 g.) in the form of a white solid, M.P. 126–127.5° C., which was then partitioned between diethyl ether (50 ml.) and water (20 ml.). The ethereal extract was washed with water (3×10 ml.) and dried over sodium sulphate. The diethyl ether was evaporated off under reduced pressure and the residue heated at 30° C./0.1 mm. Hg to give 1-(5-bromothiazol-2-yl)-1,3-dimethyl-3-n-propylurea (5.9 g.) in the form of a colourless viscous oil.

The 1,3-dimethyl-3-n-propyl-1-(thiazol-2-yl)urea used as starting material in the above preparation was obtained as follows:

Granular sodium hydride (3.1 g.) was added slowly with stirring at −5° C. to a solution of 1-methyl-3-n-propyl-1-(thiazol-2-yl)urea (19.9 g.) in anhydrous dimethylformamide (80 ml.). The reaction mixture was then stirred for one hour at 0° C. and then allowed to warm to laboratory temperature, and stirred for 24 hours. The solution was decanted from traces of unreacted sodium hydride and methyl iodide (8.6 ml.) was then added dropwise, with stirring and cooling to maintain the temperature at 15–20° C. After stirring at laboratory temperature for four hours, the mixture was filtered to remove the precipitated sodium iodide. Distillation in vacuo first removed the dimethylformamide and then gave 1,3-dimethyl-3-n-propyl-1-(thiazol-2-yl)urea (6.5 g.) in the form of a pale yellow oil, B.P. 110° C./0.01 mm. Hg.

The 1-methyl-3-n-propyl-1-(thiazol-2-yl)urea was prepared as follows:

A solution of n-propyl isocyanate (8.5 g.) in anhydrous acetone (75 ml.) was added dropwise with stirring to a solution of 2-methyl-aminothiazole (11.4 g.) in anhydrous acetone (50 ml.). After heating under reflux for 15 hours, the solution was evaporated under reduced pressure to give 1-methyl-3-n-propyl-1-(thiazol-2-yl)urea (19.9 g.) in the form of a viscous, golden oil, which was used as starting material without further purification.

According to a further feature of the present invention, there are provided compositions suitable for herbicidal use, comprising one or more of the thiazole derivatives of general Formula II or agriculturally-acceptable acid addition salts thereof in association with, and preferably homogeneously dispersed in, one or more compatible herbicidally-acceptable diluents or carriers (i.e. diluents or carriers of the type generally accepted in the art as being suitable for use in herbicidal compositions and which are compatible with the compounds of general Formula II or agriculturally-acceptable acid addition salts thereof). The term "homogeneously dispersed" is used to include compositions in which the compounds of general Formula II are dissolved in the other components. The term "herbicidal compositions" is used in a broad sense to include not only compositions which are ready for use as herbicides but also concentrates which must be diluted before use. Preferably, the compositions contain from 0.05 to 90% by weight of compounds of general Formula II or agriculturally-acceptable acid addition salts thereof.

The herbicidal compositions may contain both a diluent or carrier and a surface-active (e.g. wetting, dispersing, or emulsifying) agent. Surface-active agents which may be present in the herbicidal compositions of the present invention may be of the ionic or non-ionic types, for example sulphoricinoleates, quaternary ammonium derivatives, products based on condensates of ethylene oxide, such as condensates of ethylene oxide with nonyl- or octyl-phenols, or carboxylic acid esters of anhydrosorbitols which have been rendered soluble by etherification of the free hydroxy groups by condensation with ethylene oxide, alkali and alkaline earth metal salts of sulphuric acid esters and sulphonic acids such as dinonyl- and dioctyl-sodium sulphosuccinates and alkali and alkaline earth metal salts of high molecular weight sulphonic acid derivatives such as sodium and calcium lignosulphonates. Examples of suitable solid diluents or carriers are aluminium silicate, talc, calcined magnesia, kieselguhr, tricalcium phosphate, powdered cork, adsorbent carbon black and clays such as kaolin and bentonite. The solid compositions (which may take the form of dusts, granules or wettable powders) are preferably prepared by grinding the compounds of general Formula II or agriculturally-acceptable acid addition salts thereof with solid diluents or by impregnating the solid diluents or carriers with solutions of the compounds of general Formula II or agriculturally-acceptable acid addition salts thereof in volatile solvents, evaporating the solvents and, if necessary, grinding the products so as to obtain powders. Granular formulations may be prepared by absorbing the compounds of general Formula II or agriculturally-acceptable acid addition salts thereof (dissolved in volatile solvents) onto the solid diluents or carriers in granular form and evaporating the solvents, or by granulating compositions in powder form obtained as described above. Solid herbicidal compositions, particularly wettable powders, may contain wetting or dispersing agents (for example of the types described above), which may also, when solid, serve as diluent or carrier.

Liquid compositions according to the invention may take the form of aqueous, organic or aqueous-organic solutions, suspensions, and emulsions which may incorporate a surface-active agent. Suitable liquid diluents for incorporation in the liquid compositions include water, acetophenone, cyclohexanone, isophorone, toluene, xylene and mineral, animal and vegetable oils (and mixtures of these diluents). The surface-active agents may be ionic or non-ionic (for example of the types described above) and may, when liquid, also serve as diluents or carriers. When desired, liquid compositions of the compounds of general Formula II may be used in the form of self-emulsifying concentrates containing the active substances dissolved in the emulsifying agents or in solvents containing emulsifying agents compatible with the active substances, the simple addition of water to such concentrates producing compositions ready for use.

Herbicidal compositions according to the present invention may also contain, if desired, conventional adjuvants such as adhesives, colouring agents and corrosion inhibitors. These adjuvants may also serve as carriers or diluents.

Herbicidal compositions according to the present invention may also comprise the compounds of general Formula II or agriculturally-acceptable acid addition salts thereof in association with, and preferably homogeneously dispersed in, one or more other pesticidally active compounds and, if desired, one or more compatible pesticidally acceptable diluents or carriers, surface-active agents and conventional adjuvants as hereinbefore described. Examples of other pesticidally active compounds which may be included in, or used in conjunction with, the herbicidal compositions of the present invention include herbicides, for example phenoxyalkanoic acids

[e.g. 4-(4-chloro-2-methylphenoxy)-butyric acid,
4-(2,4-dichlorophenoxy)butyric acid,
2-(4-chloro-2-methylphenoxy)propionic acid,
2-(2,4-dichlorophenoxy)propionic acid,
4-chloro-2-methylphenoxyacetic acid,
2,4-dichlorophenoxyacetic acid and
2,4,5-trichlorophenoxyacetic acid], benzoic acid derivatives (e.g. 2,3,6-trichlorobenzoic acid,
2-methoxy-3,6-dichlorobenzoic acid and
3-amino-2,5-dichlorobenzoic acid), halogenated aliphatic acids (e.g. trichloroacetic acid and
2,2-dichloropropionic acid), carbamates

[e.g. isopropyl N-(3-chlorophenyl)carbamate,
isopropyl N-phenylcarbamate, and
3-chloro-2-butynyl N-(3-chlorophenyl)carbamate], thiocarbamates (e.g. S-2,3,3-trichloroallyl N,N-diisopropylthiocarbamate and
S-propyl N,N-dipropylthiocarbamate), amides

[e.g. 3,4-dichloropropionanilide,
2-chloro-N-isopropylacetanilide and
D-N-ethyl-2-(phenylcarbamoyloxy)propionamide], urea derivatives

[e.g. N'-(4-chlorophenyl)-N,N-dimethylurea,
N,N-dimethyl-N'-phenylurea,
N'-(3,4-dichlorophenyl)-N,N-dimethylurea and
N'-(4-chlorophenyl)-N-methoxy-N-methylurea], diazines (e.g. 5-bromo-3-isopropyl-6-methyluracil and
3-cyclohexyl-5,6-trimethyleneuracil), triazines
(e.g. 2-chloro-4,6-bis-ethylamino-1,3,5-triazine,
2-chloro-4-ethylamino-6-isopropylamino-1,3,5-triazine and
6-(3-methoxypropylamino)-4-isopropylamino-2-methylthio-1,3,5-triazine), substituted phenols

[e.g. 2-methyl-4,6-dinitrophenol,
2-(1-methylpropyl)-4,6-dinitrophenol and
2,4-dichlorophenyl 4-nitrophenyl ether], quaternary ammonium derivatives (e.g. 1,1'-ethylene-2,2'-bipyridylium and
1,1'-dimethyl-4,4'-dipyridylium salts), benzonitrile derivatives
(e.g. 2,6-dichlorobenzonitrile and
3,5-diiodo- and 3,5-dibromo-4-hydroxybenzonitriles and their esters e.g. their octanoates) triazole derivatives (e.g. 3-amino-1,2,4-triazole), thiocarbonyl derivatives

[e.g. di(methoxythiocarbonyl)disulphide], benzenesulphonylcarbamates
(e.g. methyl 4-aminobenzenesulphonylcarbamate,
methyl 4-nitrobenzenesulphonylcarbamate and
methyl 4-methoxycarbonylaminobenzenesulphonylcarbamate), 4-chloro-2-oxobenzothiazolin-3-ylacetic acid, and
2-tert-butyl-4-(2,4-dichloro-5-isopropyloxyphenyl)-5-oxo-1,3,4-oxadiazole, insecticides, e.g. naphth-1-yl N-methylcarbamate, and fungicides, e.g.

2,6-dimethyl-4-tridecylmorpholine,
methyl N-benzimidazol-2-yl-N-(butylcarbamoyl)carbamate and
1,2-bis-(3-methoxycarbonyl-2-thioureido)benzene.

Other biologically active materials which may be included in, or used in conjunction with, the herbicidal compositions of the present invention are plant growth regulators, e.g. maleic hydrazide, N-dimethylaminosuccinamic acid and (2-chloroethyl)trimethylammonium chloride, fertilizers containing nitrogen, potassium and phosphorus and trace elements known to be essential to successful plant-life, e.g. iron, magnesium, zinc, manganese, cobalt and copper.

The following examples illustrate the herbicidal compositions of the present invention. Texofor F60 is an ethylene oxide/octylphenol condensate; Celite X250 is a finely divided aluminium silicate; Belloid TD is the sodium salt of the condensation product of formaldehyde and naphthalene sulphonic acid; Celite PF is a finely divided synthetic magnesium silicate; Texofor 65A9P is a propylene oxide/higher fatty alcohol condensate; Arylan CA is calcium dodedecylbenzenesulphonate; Ethylan TU is an ethylene oxide/nonylphenol condensate; Morpan BB (Grade B) is an aqueous solution (50% w./v.) of a benzalkonium bromide.

Example 30

A wettable powder is formed from the following:

|  | G. |
| --- | --- |
| 1-(5-bromothiazol-2-yl)-1,3-dimethylurea | 25 |
| Texofor F60 | 10 |
| Celite X250 | 65 | by dissolving the thiazole derivative in acetone (ca. 1 litre), syraping this solution onto a mixture of the other ingredients in a ribbon-blender and grinding the resultant powder to a suitable fineness. This powder is suspended in water and applied at rates of from 1 to 4 lbs. of thiazole derivative in 30 gallons of water per acre to control *Chenopodium album, Polygonum lapathifolium, Sinapis arvensis, Stellaria media, Alopecurus myosuroides, Avena fatua* and *Poa annua* by pre- or post-emergence application.

A wettable powder for similar uses may be prepared by proceeding as described above but replacing the 1-(5-bromothiazol-2-yl)-1,3-dimethylurea by the same quantity of 1-(5-chlorothiazol-2-yl)-1-ethyl-3-methylurea.

Example 31

A wettable powder is formed from the following:

|  | G. |
| --- | --- |
| 1-(5-bromothiazol-2-yl)-1,3,3-trimethylurea | 25 |
| Texofor F60 | 10 |
| Celite X250 | 65 | by dissolving the thiazole derivative in acetone (ca. 1 litre), spraying this solution onto a mixture of the other ingredients in a ribbon-blender and grinding the resultant powder to a suitable fineness. This powder is suspended in water and applied at rates of from 1 to 4 lbs. of thiazole derivative in 30 gallons of water per acre to control *Chenopodium album, Polygonum lapathifolium, Sinapis arvensis, Stellaria media, Alopecurus myosuroides, Avena fatua* and *Poa annua* by pre- or post-emergence application.

A wettable powder for similar uses may be prepared by proceeding as described above but replacing the 1-(5-bromothiazol-2-yl)-1,3,3-trimethylurea by the same quantity of 1-(5-chlorothiazol-2-yl)-1-ethyl-3-methylurea.

Example 32

An emulsifiable concentrate is prepared from the following:

| 1-(5-bromothiazol-2-yl)-1,3-dimethylurea | 20% w./v. |
| --- | --- |
| Arylan CA | 5% w./v. |
| Ethylan TU | 5% w./v. |
| Isophorone 2 parts by volume<br>Xylene 1 part by volume | To 100% by volume. | by dissolving the urea derivative, the Arylan CA and the Ethylan TU in the mixture of isophorone and xylene. This concentrate may be diluted with water and applied at a rate of 1.5 lbs. of urea derivative in 20 gallons of water per acre to control Polygonum spp., Brassica spp., Matricaria spp., Chenopodium spp., *Stellaria media, Galeopsis tetrahit, Chrysanthemum segetum, Lamium pur-* *pureum, Poa annua* and *Alopecurus myosuroides* in crops of potatoes by post-emergence application before the emergence of the crop.

Emulsifiable concentrates for similar uses may be prepared by proceeding as described above but replacing the 1 - (5-bromothiazol-2-yl)-1,3-dimethylurea by the same quantity of 1 - (5-chlorothiazol-2-yl)-1,3,3-trimethylurea, 1-(5-bromothiazol-2-yl)-1-ethyl-3-methylurea, 1-(5-chlorothiazol-2-yl)-1-ethyl-3-methylurea, 1-(5-bromothiazol-2-yl)-1-ethyl-3,3-dimethylurea, 1-(5-iodothiazol-2-yl)-1,3,3-trimethylurea or 1-(5-iodothiazol-2-yl)-1-ethyl-3-methyl-urea.

Example 33

A powder is prepared from the following:

|  | Percent w./w. |
| --- | --- |
| 1-(5-bromothiazol-2-yl)-1,3-dimethylurea | 50 |
| Belloid TD | 5 |
| Celite PF | 45 | by dissolving the urea derivative in acetone, dispersing the solution obtained on the Celite PF and evaporating off the acetone. The Belloid TD is then blended with the solid product. The powder obtained may be dispersed by stirring with water and the suspension obtained applied at a rate of 1 lb. of urea derivative in 20 gallons of water per acre to control Amaranthus spp., Chenopodium spp., Polygonum spp., Digitaria spp., Setaria spp., and Bromus spp., by pre-emergence application in crops of maize before the crop has emerged.

A powder for similar uses may be prepared by proceeding as described above but replacing the 1-(5-bromothiazol-2-yl)-1,3-dimethylurea by the same quantity of 1-(5-chlorothiazol-2-yl)-1-ethyl-3-methylurea.

Example 34

A concentrate in the form of an aqueous suspension is prepared from the following:

|  | Percent w./v. |
| --- | --- |
| 1-(5-bromothiazol-2-yl)-1,3-dimethylurea | 40 |
| Texofor 65 A9P | 0.5 |
| Distilled water to 100% by volume. |  | by mixing the ingredients and grinding them together in a ball mill for 12 hours. The aqueous suspension concentrate obtained may be diluted with water and applied at a rate of 2 lbs. of urea derivative in 10 gallons of water per acre to control *Bracharia cruciformis, Cynodon dactylon, Echinochloa crus-galli* and *Leptochola filiformis* in crops of sugar cane by pre-emergence application before or after the crop has emerged.

Concentrates in the form of aqueous suspensions for similar uses may be prepared by proceeding as described above but replacing the 1-(5-bromothiazol-2-yl)-1,3-dimethylurea by the same quantity of 1-(5-bromothiazol-2-yl)-1,3,3-trimethylurea, 1-(5-chlorothiazol - 2 - yl)-1,3,3-trimethylurea or 1-(5-chlorothiazol-2-yl)-1-ethyl-3-methylurea.

Example 35

An emulsifiable concentrate is prepared from the following:

| 1-(5-chlorothiazol-2-yl)-1,3-dimethylurea | 20% w./v. |
| --- | --- |
| Arylan CA | 5% w./v. |
| Ethylan TU | 5% w./v. |
| Isophorone 2 parts by volume<br>Xylene 1 part by volume | to 100% by volume. | by dissolving the urea derivative, the Arylan CA and the Ethylan TU in the mixture of isophorone and xylene. The concentrate obtained may be diluted with water and applied at a rate of 1 lb. of urea derivative in 40 gallons of water per acre to control *Amsinckia* spp., *Amaranthus* spp., *Polygonum* spp., *Digitaria* spp., and *Setaria* spp., in crops of French beans by pre-emergence application before the crop has emerged.

Emulsifiable concentrates for similar uses may be prepared by proceeding as described above but replacing the 1-(5-chlorothiazol-2-yl)-1,3-dimethylurea by the same quantity of 1-(5-chlorothiazol-2-yl)-1,3,3-trimethylurea, 1-(5-bromothiazol-2-yl)-ethyl-3-methylurea, 1-(5-chlorothiazol-2-yl)-1-ethyl-3-methylurea or 1-(5-bromothiazol-2-yl)-1-ethyl-3,3-dimethylurea.

Example 36

A powder is prepared from the following:

| | Percent w./w. |
|---|---|
| 1-(5-chlorothiazol-2-yl)-1-ethyl-3-methylurea | 50 |
| Belloid TD | 5 |
| Celite PF | 45 | by dissolving the urea derivative in acetone, dispersing the solution obtained on the Celite PF and evaporating off the acetone. The Belloid TD is then blended with the solid product. The powder obtained may be dispersed by stirring with water and the suspension obtained applied at a rate of 1 lb. of urea derivative in 20 gallons of water per acre to control *Alopecurus myosuroides, Poa annua, Avena fatua, Chenopodium album, Galinsoga parviflora, Polygonum aviculare, Spergula arvensis* and *Veronica* spp. in crops of wheat by pre-emergence application before the crop has emerged.

Example 37

A water soluble concentrate is prepared from the following:

| | |
|---|---|
| 1,3-dimethyl-1-(5-iodothiazol-2-yl)urea | 20% w./v. |
| Morpan BB (Grade B) | To 100% by volume. | by dissolving the urea derivative in the Morpan BB (Grade B). The concentrate obtained may be diluted with water and applied at a rate of 1 lb. of urea derivative in 40 gallons of water per acre to control *Plantago* spp., *Stellaria media, Veronica* spp., and *Urtica urens* in nursery stocks of blackcurrant bushes by post-emergence application.

Concentrates in the form of aqueous suspensions for similar uses may be prepared by proceeding as described above but replacing the 1,3-dimethyl-1-(5-iodothiazol-2-yl)urea by the same quantity of 1-(5-bromothiazol-2-yl)-1,3,3-trimethylurea, 1-(5-chlorothiazol-2-yl)-1,3,3-trimethyl urea or 1-(5-chlorothiazol-2-yl)-1-ethyl-3-methylurea.

Example 38

An emulsifiable concentrate is prepared from the following:

| | |
|---|---|
| 1-(5-bromothiazol-2-yl)-1,3,3-trimethylurea | 20% w./v. |
| Arylan CA | 5% w./v. |
| Ethylan TU | 5% w./v. |
| Isophorone 2 parts by volume<br>Xylene 1 part by volume | To 100% by volume. | by dissolving the urea derivative, the Arylan CA and the Ethylan TU in the mixture of isophorone and xylene. The concentrate obtained may be diluted with water and applied at a rate of 0.75 lb. of urea derivative in 10 gallons of water per acre to control *Digitaria* spp., *Echinochloa* spp., *Eleusine* spp., *Setaria* spp., *Euphorbia* spp., and *Portulaca* spp. in crops of groundnuts by pre-emergence application before the crop has emerged.

Emulsifiable concentrates for similar uses may be prepared by proceeding as described above but replacing the 1-(5-bromothiazol-2-yl)-1,3,3-trimethylurea by the same quantity of 1-(5-chlorothiazol-2-yl)-1,3,3-trimethylurea, 1-(5-bromothiazol-2-yl)-1-ethyl-3-methylurea, 1-(5-chlorothiazol-2-yl)-1-ethyl-3-methylurea or 1-(5-bromothiazol-2-yl)-1-ethyl-3,3-dimethylurea.

Example 39

An emulsifiable concentrate is prepared from the following:

| | |
|---|---|
| 1-(5-bromothiazol-2-yl)-1,3-dimethylurea | 20% w./v. |
| 3,5-diiodo-4-n-octanoyloxybenzonitrile (ioxynil octanoate) | 7.2% w./v. |
| Atlox 3403 | 5% w./v. |
| Atlox 3404 | 5% w./v. |
| Isophorone 2 parts by volume<br>Xylene 1 part by volume | To 100% by volume. | by dissolving the urea derivative, the benzonitrile ester, the Atlox 3403 and the Altox 3404 in the mixture of isophorone and xylene. The concentrate obtained may be diluted with water and applied at a rate of 12 ozs. of urea derivative and 3 ozs. ioxynil equivalent of ioxynil octanoate in 40 gallons of water per acre to control *Avena fatua, Polygonum* spp., *Stellaria media* and *Veronica* spp., in crops of potatoes by post-emergence application before emergence of the crop.

Example 40

An emulsifiable concentrate is prepared from the following:

| | |
|---|---|
| 1-(5-chlorothiazol-2-yl)-1,3-dimethylurea | 15% w./v. |
| 2,4-dichlorophenoxyacetic acid iso-octyl ester (2,4-D iso-octyl ester) | 15% w./v. |
| Atlox 3403 | 5% w./v. |
| Atlox 3404 | 5% w./v. |
| Isophorone 2 parts by volume<br>Xylene 1 part by volume | To 100% by volume. | by dissolving the urea derivative, the 2,4-D ester, the Atlox 3403 and the Atlox 3404 in the mixture of isophorone and xylene. The concentrate may be diluted with water and applied at a rate of 1.5 lbs. of urea derivative and 1 lb. of 2,4-D equivalent of 2,4-D iso-octyl ester in 40 gallons of water per acre to control *Eleusine* spp., *Echinochloa* spp., *Cyperus rotundus, Ageratum* spp., and *Bidens* spp. in sugar cane sets by post-emergence application.

Atlox 3403 is a polyoxyethylene ether polyoxyethylene glyceride alkyl aryl sulphonate blend, and Atlox 3404 is a polyoxyethylene alkyl aryl ether-alkyl aryl sulphonate blend.

We claim:

1. Thiazole derivatives of the formula:

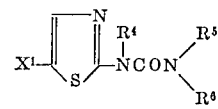

wherein $X^1$ represents chlorine, bromine or iodine, $R^4$ represents methyl or ethyl, $R^5$ represents hydrogen or methyl and $R^6$ represents methyl or, when $R^4$ and $R^5$ each represent methyl, ethyl or n-propyl, and agriculturally-acceptable acid addition salts thereof.

2. Thiazole compounds according to claim 1 wherein $R^4$ and $R^6$ each represent methyl and $R^5$ represents hydrogen or methyl.

3. The thiazole derivative according to claim 1 which is 1-(5-bromothiazol-2-yl)-1,3-dimethylurea and agriculturally-acceptable acid addition salts thereof.

4. The thiazole derivative according to claim 1 which is 1 - (5- chlorothiazol-2-yl)-1,3-dimethylurea and agriculturally-acceptable acid addition salts thereof.

5. The thiazole derivative according to claim 1 which is 1 - (5-iodothiazol-2-yl)-1,3-dimethylurea and agriculturally acceptable acid addition salts thereof.

6. The thiazole derivative according to claim 1 which is 1 - (5-bromothiazol-2-yl)-1,3,3-trimethylurea and agriculturally-acceptable acid addition salts thereof.

7. The thiazole derivative according to claim 1 which is 1 - (5-chlorothiazol-2-yl)-1,3,3-trimethylurea and agriculturally-acceptable acid addition salts thereof.

8. The thiazole derivative according to claim 1 which is 1 - (5-iodothiazol-2-yl)-1,3,3-trimethylurea and agriculturally-acceptable acid addition salts thereof.

References Cited
FOREIGN PATENTS 1,131,207  10/1968  Great Britain ____ 260—306.8 R ALEX MAZEL, Primary Examiner R. J. GALLAGHER, Assistant Examiner U.S. Cl. X.R.

71—73, 90